(12) United States Patent
Komeda et al.

(10) Patent No.: US 7,178,618 B2
(45) Date of Patent: Feb. 20, 2007

(54) VEHICULAR CONTROL APPARATUS AND METHOD

(75) Inventors: Osamu Komeda, Mishima (JP); Mitsuhiro Tabata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 47 days.

(21) Appl. No.: 10/301,570

(22) Filed: Nov. 22, 2002

(65) Prior Publication Data

US 2003/0098185 A1 May 29, 2003

(30) Foreign Application Priority Data

Nov. 29, 2001 (JP) .............................. 2001-365294

(51) Int. Cl.
*B60K 6/00* (2006.01)

(52) U.S. Cl. ..................................... 180/65.2; 180/165

(58) Field of Classification Search ............... 180/65.2, 180/65.3, 65.4, 165; 477/3, 5, 174; 701/51, 701/53

See application file for complete search history.

(56) References Cited

U.S. PATENT DOCUMENTS

| | | | |
|---|---|---|---|
| 4,377,223 A | | 3/1983 | Sakakiyama et al. |
| 4,679,646 A | * | 7/1987 | Greenwood .................. 180/165 |
| 4,923,025 A | * | 5/1990 | Ellers ......................... 180/65.2 |
| 5,549,172 A | * | 8/1996 | Mutoh et al. ............... 180/65.1 |
| 5,713,425 A | * | 2/1998 | Buschhaus et al. ......... 180/65.2 |
| 5,879,265 A | * | 3/1999 | Bek .............................. 477/1 |
| 5,927,415 A | * | 7/1999 | Ibaraki et al. .............. 180/65.2 |
| 6,057,605 A | * | 5/2000 | Bourne et al. ............. 290/40 C |
| 6,073,712 A | * | 6/2000 | Buglione .................... 180/65.2 |
| 6,119,799 A | | 9/2000 | Morisawa et al. |
| 6,132,335 A | * | 10/2000 | Fischer ....................... 477/169 |
| 6,299,563 B1 | * | 10/2001 | Shimasaki ..................... 477/5 |
| 6,317,665 B1 | * | 11/2001 | Tabata et al. ................. 701/22 |

(Continued)

FOREIGN PATENT DOCUMENTS

FR 2 035 574 12/1970

(Continued)

OTHER PUBLICATIONS

Masding P W et al.: "A Microprocessor Controlled Gearbox for Use in Electric and Hybrid-Electric Vehicles" Transactions of the Institute of Measurement and Control, Institute of Measurement and Control. Dorking, GB, vol. 10, No. 4, Jul. 1, 1988, pp. 177-186, XP000112276 ISSN: 0142-3312 The entire document p. 186, col. 1, paragraph 2.

*Primary Examiner*—Frank Vanaman
(74) *Attorney, Agent, or Firm*—Oliff & Berridge PLC

(57) ABSTRACT

A control apparatus of a vehicle includes a clutch provided between a driving force source and a drive wheel; a torque transfer power controller that controls a torque transfer power of the clutch based on a predetermined condition; a behavior control apparatus that is provided separately from the clutch, that adjusts a physical quantity related to a speed of the vehicle that changes with a control of the torque transfer power of the clutch by the torque transfer power controller; and a function determiner that determines a vehicle speed control function of the behavior control apparatus, wherein the torque transfer power controller controls the torque transfer power of the clutch based on the predetermined condition and a result of determination provided by the function determiner.

17 Claims, 13 Drawing Sheets

U.S. PATENT DOCUMENTS

| | | |
|---|---|---|
| 6,319,167 B1 | 11/2001 | Yoshida et al. |
| 6,342,027 B1 * | 1/2002 | Suzuki ........................... 477/5 |
| 6,430,483 B2 * | 8/2002 | Takaoka et al. ............... 701/22 |
| 6,540,642 B2 * | 4/2003 | Tabata ........................... 477/5 |
| 6,574,535 B1 * | 6/2003 | Morris et al. .................. 701/22 |
| 6,591,705 B1 | 7/2003 | Reik et al. |
| 6,712,165 B1 | 3/2004 | Okazaki |
| 2001/0003109 A1 | 6/2001 | Tabata |

FOREIGN PATENT DOCUMENTS

| | | |
|---|---|---|
| JP | A 2000-245010 | 9/2000 |
| JP | A 2000-308206 | 11/2000 |
| JP | A-2000-335264 | 12/2000 |
| KR | A-2001-0033540 | 4/2001 |
| WO | WO 00/74966 A1 | 12/2000 |

* cited by examiner

VEHICULAR CONTROL APPARATUS AND METHOD

INCORPORATION BY REFERENCE

The disclosure of Japanese Patent Application No. 2001-365294 filed on Nov. 29, 2001, including its specification, drawings and abstract, is incorporated herein by reference in its entirety.

BACKGROUND OF THE INVENTION

1. Field of the Invention

The invention relates to a control apparatus and a control method of a vehicle, that controls at least one of the driving force and the braking force of a vehicle and a vehicular control method.

2. Description of the Related Art

Among known transmissions disposed between a driving force source and a drive wheel of a vehicle, there is a stepwise variable transmission that shifts the speed ratio by controlling the states of engagement and disengagement of engagement devices such as a synchromesh mechanism, a friction engagement device, etc. A vehicle having a friction type clutch or an electromagnetic clutch between a stepwise variable transmission and a driving force source performs a control of reducing the torque transfer power of the clutch at the time of a speed shift. Reduction in the torque transfer power of the clutch at the time of a speed shift reduces the torque transferred from the driving force source to a drive wheel. As a result, the accelerating performance of the vehicle drops, incurring the possibility of discomforting an occupant in the vehicle.

Furthermore, if a speed shift is performed and the torque transfer power of the clutch is reduced while the vehicle is coasting with a generally-termed engine brake force caused by transfer of kinetic energy from wheels to the driving force source, the engine brake force temporarily weakens at the time of the speed shift, incurring the possibility of discomforting a vehicle occupant. Vehicular control apparatuses capable of avoiding the aforementioned drawbacks are known. For example, Japanese Patent Application Laid-Open Publication No. 2000-308206 describes such a vehicular control apparatus.

A vehicle described in this patent application is designed so that power of an engine is transferred to driving wheels via a transmission and a drive shaft. A motor-generator is connected to the drive shaft. The motor-generator is driven by supplying it with electric power from a battery, and torque of the motor-generator is transferred to the driving wheels via the drive shaft. The transmission installed in this vehicle is a stepwise variable transmission equipped with a synchromesh mechanism. By switching the synchromesh mechanism, the transmission achieves speed shifts.

At the time of a speed shift operation of the transmission involving the discontinuation of transfer of torque from the engine to the drive wheels, the drop in acceleration can be reduced by transferring torque of the motor-generator to the driving wheels. At the time of a speed shift of the transmission during a coasting run of the vehicle, the drop in the braking force that acts on the vehicle can be reduced by increasing the regenerative brake force of the motor-generator.

The motor-generator as described in the aforementioned patent application undergoes changes in the outputtable torque or regenerative torque depending on various conditions, such as the temperature of the motor-generator, the temperature of the battery, the state of charge of the battery, the voltage of the battery, etc. Therefore, depending on these conditions, the motor-generator becomes unable to generate a target regenerative torque or a target output torque needed for a speed shift of the transmission. Hence, there exits a possibility that a speed shift may change the braking force or the driving force, and therefore may discomfort a vehicle occupant.

SUMMARY OF THE INVENTION

It is an object of the invention to provide a control apparatus and a control method of a vehicle, capable of curbing increase in the amount of change in at least one of the driving force and the braking force of a vehicle at the time of controlling the torque transfer power of a clutch even if the function of a vehicle behavior control apparatus has declined.

A first aspect of the invention is a control apparatus of a vehicle in which a torque transfer power of a clutch provided between a driving force source and a drive wheel is controlled based on a predetermined condition, and a physical quantity related to a speed of the vehicle that changes with a control of the torque transfer power of the clutch is adjusted by a behavior control apparatus that is provided separately from the clutch. The control apparatus includes: a function determiner that determines a vehicle speed control function of the behavior control apparatus; and a torque transfer power controller that controls the torque transfer power of the clutch based on the predetermined condition and a result of determination provided by the function determiner.

According to the above-described aspect of the invention, when the torque transfer power of the clutch is to be reduced, changes of the vehicle speed can be controlled even if the vehicle speed adjusting function of the control apparatus is low. Therefore, changes of the vehicle speed can be curbed, thereby avoiding discomforting a vehicle occupant.

According to an advantageous modification of the invention, the predetermined condition may include a speed shift control of a transmission provided between the clutch and the drive wheel.

Therefore, when the torque transfer power of the clutch is reduced at the time of a speed shift of the transmission, the aforementioned advantage can be achieved.

According to a further advantageous modification of the invention, the control apparatus may further include a speed shift vehicle speed selector that selects a vehicle speed that serves as a reference for the speed shift control of the transmission based on a vehicle speed adjusting function of the behavior control apparatus determined by the function determiner.

Furthermore, even if the vehicle speed adjusting function of the behavior control apparatus is low, and when the vehicle speed is high, the driving force source rotation speed can be increased to increase the vehicle acceleration. Hence, the reduction in the vehicle speed adjusting function of the behavior control is unlikely to affect the behavior of the vehicle. Furthermore, even if the vehicle speed adjusting function of the behavior control apparatus is low, the setting of the speed shift vehicle speed at a low vehicle speed will prevent an undesired event where "a driver is discomforted by an acceleration loss" at the time of a speed shift. Therefore, an acceleration drop can be more reliably prevented.

The behavior control apparatus may include a motor-generator.

Furthermore, the driving force can be adjusted via the motor-generator. Since the motor-generator has both a powering function and a regeneration function, there is no need to provide a driving force adjusting device and a braking force adjusting device separately, thus contributing to reductions in the number of component parts and the number of manufacturing man-hours In the above-described constructions, the behavior control apparatus may have a flywheel that adjusts the vehicle speed by storing a kinetic energy during a run of the vehicle and transferring a stored kinetic energy to a wheel.

Furthermore, kinetic energy during a run of the vehicle is stored by the flywheel, and kinetic energy is transferred from the flywheel to the wheel. In this manner, the vehicle speed is adjusted. If the acceleration request has increased, kinetic energy stored on the flywheel can be transferred to the wheel so as to adjust the vehicle speed. Therefore, when the vehicle speed is to be adjusted, there is no need to supply energy from outside the vehicle, thus achieving an economical advantage.

Furthermore, the control apparatus may further include an energy conversion apparatus that has a function of converting a kinetic energy transferred from the wheel to the flywheel into an electric energy and retaining the electric energy, and a function of converting a retained electric energy into a kinetic energy and transferring the kinetic energy to the wheel via the flywheel.

Furthermore, although the kinetic energy stored on the flywheel gradually decreases due to air resistance, conversion of kinetic energy into electric energy reduces such an energy reduction drawback. That is, if the kinetic energy stored on the flywheel becomes low, the electric energy can be converted into kinetic energy, and the kinetic energy can be transferred to the wheel via the flywheel. Therefore, the function of adjusting the vehicle speed improves.

Functional means described above can be realized by a controller such as an electronic control unit or the like.

In the foregoing description, the "torque transfer power of the clutch" includes both the torque transferred by the clutch and the power (hydraulic pressure, electromagnetic force, etc.) applied to the clutch from an actuator in order to control the torque transferred by the clutch. The "torque transfer power of the clutch" may also be termed "torque capacity of the clutch". The "vehicle speed control function" in the foregoing description includes a driving force adjusting function and a braking force adjusting function.

A second aspect of the invention is a control method for a vehicle in which a torque transfer power of a clutch provided between a driving force source and a drive wheel is controlled based on a predetermined condition, and a physical quantity related to a speed of the vehicle that changes with a control of the torque transfer power of the clutch is adjusted by a behavior control apparatus that is provided separately from the clutch. The control method includes a step of determining a vehicle speed control function of the behavior control apparatus, and a step of controlling the torque transfer power of the clutch based on the predetermined condition and a result of the determination.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

[First Embodiment]

Figure 2:
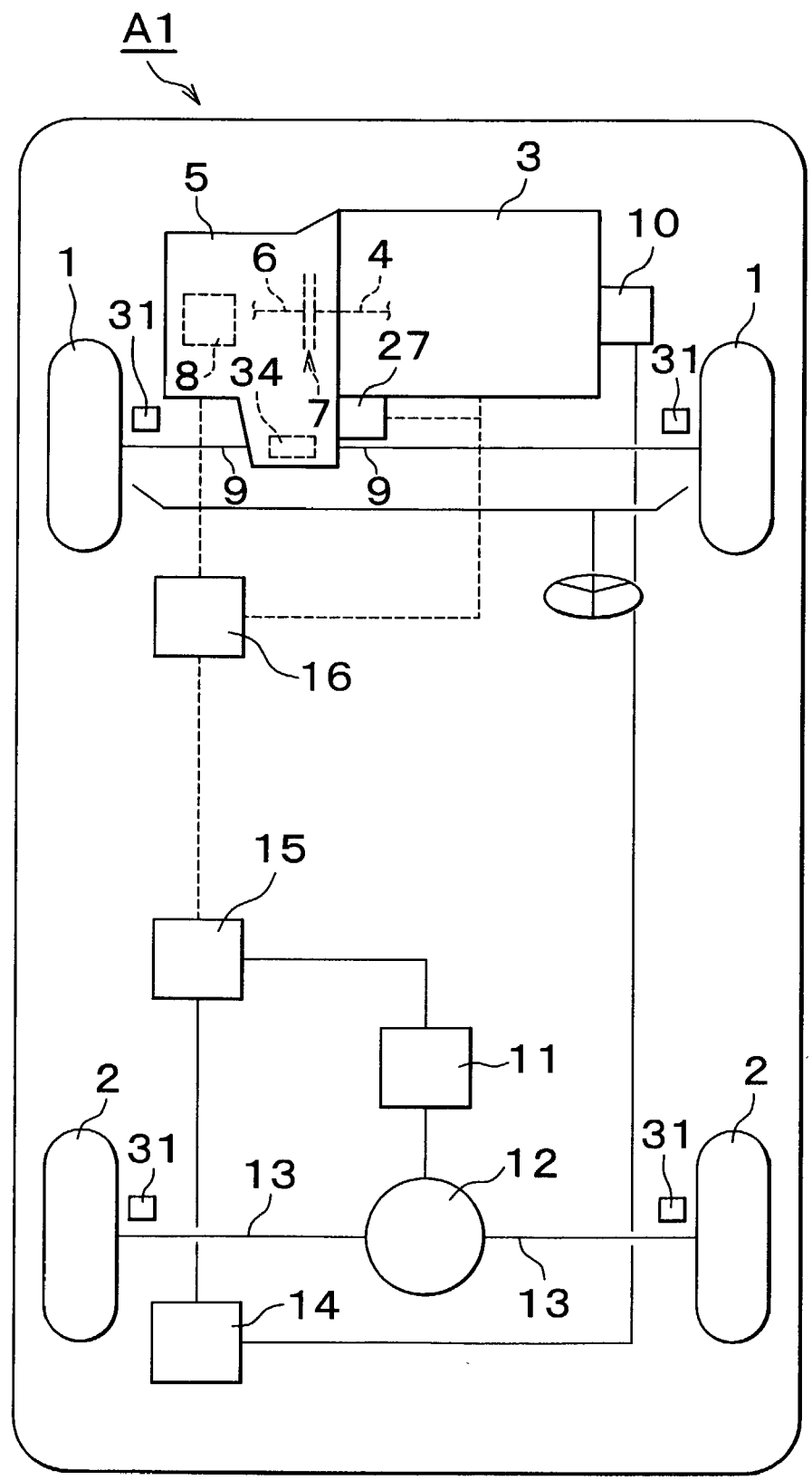
FIG. 2 is a conceptual drawing illustrating an exemplary vehicle to which the flowchart of FIG. 1 can be applied.

A first embodiment of the invention will be described below with reference to drawings. FIG. 2 is a conceptual diagram illustrating an exemplary vehicle. A vehicle A1 has front wheels 1 and rear wheels 2. The construction of a power train corresponding to the front wheels 1 will first be described. An engine 3 is provided in a forward portion of the vehicle A1. The engine 3 is of a type that outputs power due to combustion of fuel. The engine 3 may be an internal combustion engine, more specifically, a gasoline engine, a diesel engine, an LPG engine, etc.

A clutch 7 is provided between a crankshaft 4 of the engine 3 and an input shaft 6 of a transmission 5. The transmission 5 has an engagement device 8 that controls the ratio between the rotational speed of the input shaft 6 and the rotational speed of an output shaft (not shown) of the transmission 5, that is, the speed ratio. The engagement device 8 may be, for example, a synchromesh mechanism, a friction engagement device, etc. The output shaft of the transmission 5 is connected to a differential 34. An output side of the differential 34 is connected to the front wheels 1 via drive shafts 9. An alternator 10 is connected to the crankshaft 4.

Next described will be a power train corresponding to the rear wheels 2. A motor-generator 11 and a differential 12 are provided in a rearward portion of the vehicle A1. The motor-generator 11 performs both a powering function and a regeneration function. The differential 12 is connected to an output side of the motor-generator 11. The differential 12 is connected to the rear wheels 2 via axle shafts 13.

As is apparent from the foregoing description, the vehicle A1 is a generally-termed four-wheel drive vehicle that is capable of producing drive force by transferring torque at least either the front wheels 1 or the rear wheels 2. An electricity storage 14 is provided in a rearward portion of the vehicle A1. The electricity storage 14 may be a battery, a capacitor, etc. The electricity storage 14 is connected to the motor-generator 11 via an inverter 15. The electricity storage 14 is also connected to the alternator 10.

Figure 3:
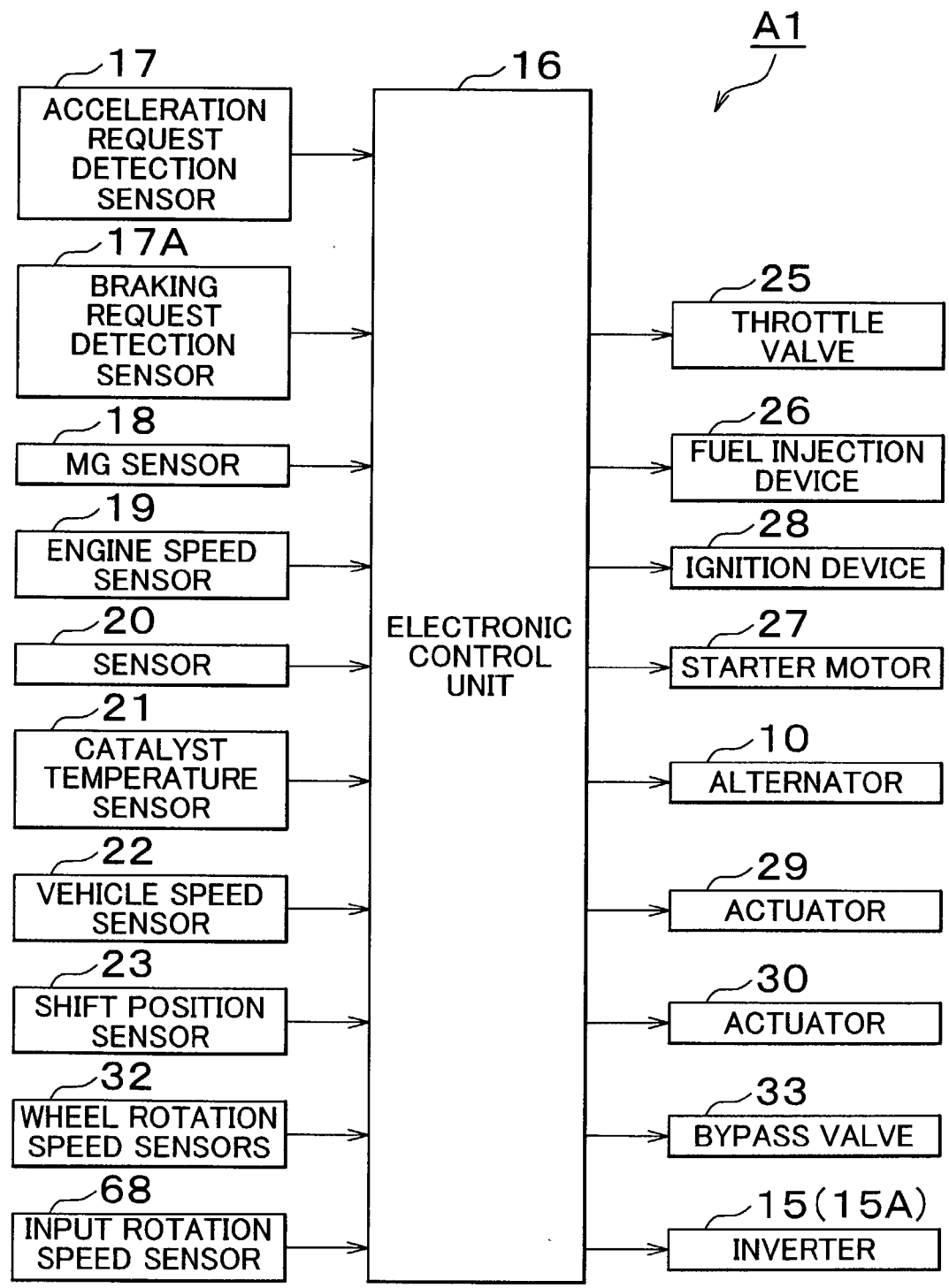
FIG. 3 is a block diagram illustrating a control system of the vehicle shown in FIG. 2.

An electronic control unit (ECU) 16 that performs overall control of the vehicle A1 is provided. The electronic control unit 16 is formed by a microcomputer that has a CPU (central processing unit), storage units (RAM, ROM), and input and output interfaces as major components. Referring to FIG. 3, the electronic control unit 16 receives input of signals from various sensors, such as an acceleration request detection sensor 17, a braking request detection sensor 17A, an MG sensor 18 that detects states of the motor-generator 11, an engine speed sensor 19, a sensor 20 that detects states of the electricity storage 14, a catalyst temperature sensor 21 provided in an exhaust system of the engine 3, a vehicle speed sensor (a sensor that detects the rotation speed of the output shaft of the transmission 5) 22, a shift position sensor 23, wheel rotation speed sensors 32 that detect the rotation speeds of the front wheels 1 and the rear wheels 2, an input rotation speed sensor 68 that detects the rotation speed of the input shaft 6 of the transmission 5, etc.

The MG sensor 18 detects the temperature of the motor-generator 11, the rotation speed and rotation angle of the motor-generator 11, etc. The sensor 20 detects the state of charge (SOC) of the electricity storage 14, the voltage and the temperature thereof, etc. The shift position sensor 23 detects the shift position that is selected via a shift device (not shown) for the purpose of controlling the transmission 5. The acceleration request detection sensor 17 detects, for example, the state of operation of an accelerator pedal (not shown). The braking request detection sensor 17A detects, for example, the state of operation of a brake pedal (not shown).

The electronic control unit 16 outputs various control signals, such as a signal for controlling the degree of opening of a throttle valve 25, a signal for controlling a fuel injection device 26, a signal for controlling an ignition device 28, a signal for controlling a starter motor 27, a signal for controlling the alternator 10, a signal for controlling an actuator 29 that controls the torque transfer power of the clutch 7, a signal for controlling an actuator 30 that controls the action of the engagement device 8, a signal for controlling a bypass valve 33, a signal for controlling the inverter 15, etc. The actuators 29, 30 may be, for example, hydraulic actuators, electromagnetic actuators, etc.

The throttle valve 25 is a valve that controls the amount of intake air. The bypass valve 33 is a valve that opens and closes a bypass exhaust passage which connects between an upstream side and a downstream side of a catalyst provided in the exhaust system, and which extends in parallel to the catalyst.

In the vehicle illustrated in FIGS. 2 and 3, the output of the engine 3, the speed ratio of the transmission 5, the torque transfer power of the clutch 7, the output of the motor-generator 11, etc., are controlled on the basis of sensor signals input to the electronic control unit 16, and data stored in the electronic control unit 16. Torque of the engine 3 is transferred to the front wheels 1 via the transmission 5, thereby producing vehicle driving force. During the coasting run of the vehicle A1, kinetic energy of the front wheels 1 is transferred to the engine 3 via the transmission 5, thereby producing engine brake force.

The speed ratio of the transmission 5 is controlled on the basis of the signal from the acceleration request detection sensor 17, the signal from the vehicle speed sensor 22, and a speed shift map stored in the electronic control unit 16. The speed shift of the transmission 5 includes upshifts in which the speed ratio becomes smaller after a speed shift than before the speed shift, and downshifts in which the speed shift becomes greater after a speed shift than before. An upshift is performed, for example, during an increase in the vehicle speed (acceleration). A downshift is performed, for example, during a decrease in the vehicle speed (deceleration).

If it is determined that the speed ratio of the transmission 5 is to be changed, the torque transfer power of the clutch 7 is reduced from the level occurring before the determination is made. After the engagement device 8 is switched, the torque transfer power of the clutch 7 is increased. Thus, at the time of a speed shift control of the transmission 5, the torque transfer power of the clutch 7 temporarily drops. Therefore, the driving force on the front wheels 1 decreases, and the acceleration of the vehicle decreases.

Therefore, in order to curb the "decrease in acceleration involved in a shift of the speed ratio of the transmission 5", the following control may be performed. That is, a torque corresponding to the amount of reduction in the torque transferred from the engine 3 to the front wheels 1 is produced by driving the motor-generator 11 as an electric motor, and the produced torque is transferred to the rear wheels 2. In this manner, the decrease in the driving force of the vehicle A1 is curbed. That is, in this control, the shortfall of engine torque is substantially covered by torque from the motor-generator 11.

In contrast, during a coasting run of the vehicle A1, kinetic energy of the front wheels 1 is transferred to the engine 3, thus producing engine brake force. Furthermore, if a braking request is made during a run of the vehicle A1, a braking force is produced by the function of a brake device 31. The brake device 31 is of a known type having a master cylinder, wheel cylinders, etc., and having a generally-termed brake-by-wire structure. The brake device 31 does not function as a driving force source of the vehicle A1.

On the basis of the signal from the braking request detection sensor 17A and pre-stored data, a target braking request is determined, and a relative relationship between the braking force produced by the brake device 31 and the regenerative braking force produced by the motor-generator 11 is controlled. That is, kinetic energy generated by a coasting run of the vehicle A1 (i.e., inertia energy) is transferred from the rear wheels 2 to the motor-generator 11 via the differential 12, and the motor-generator 11 is caused to function as an electric generator. In this manner, a regenerative braking force is generated. The shortfall of the regenerative braking force from the target braking request can be covered by the brake device 31.

In a case where torque assist by the motor-generator 11 is performed at the time of a speed shift of the transmission 5, there is a possibility of insufficient driving force being caused due to the motor-generator 11 being unable to output a target torque that is needed for the torque assist. Furthermore, in a case where the regenerative braking force of the motor-generator 11 is controlled corresponding to a target braking force, there is a possibility that the braking force that needs to be produced by the brake device 31 may increase if the state of charge of the electricity storage 14 is high.

Figure 1:
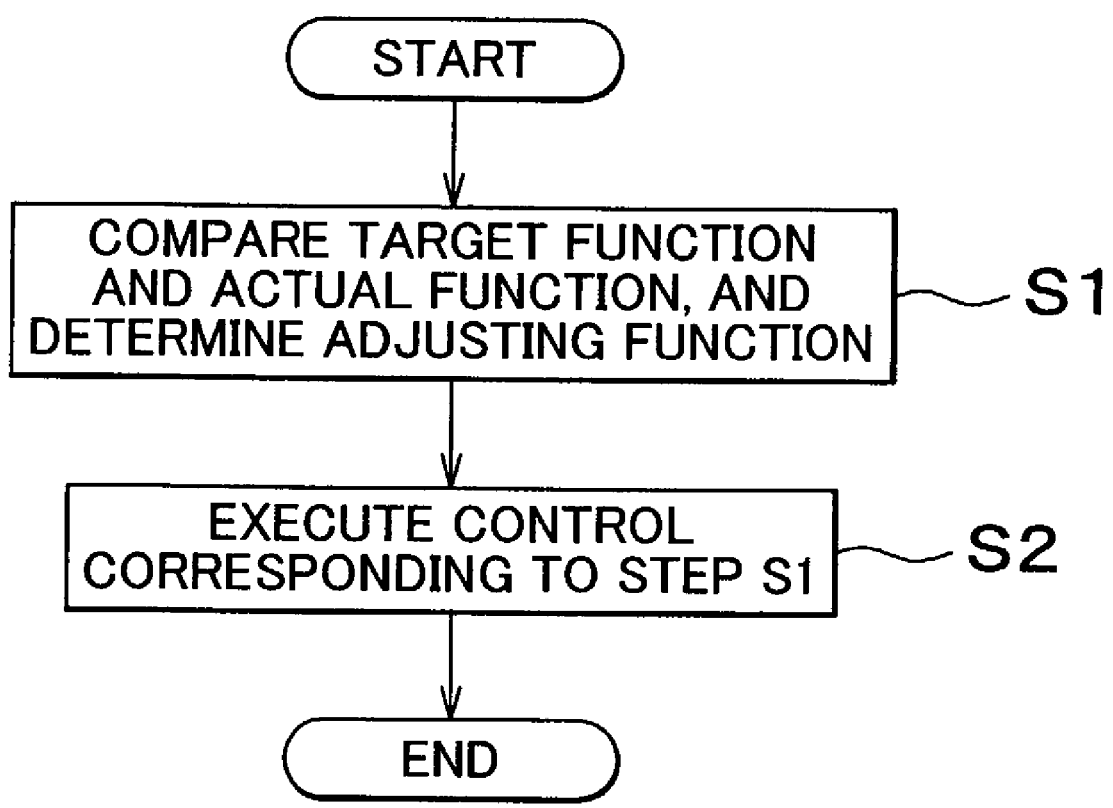
FIG. 1 is a flowchart illustrating an exemplary control apparatus of a vehicle in the invention.

In this embodiment, therefore, the driving force and the braking force can be adjusted by performing a control as illustrated in FIG. 1. In this control, a driving force or braking force-adjusting function of the motor-generator 11 is determined (step S1). In step S1, the driving force adjusting function of the motor-generator 11 can be determined by comparing a target torque and the torque that can be output from the motor-generator 11. Furthermore, in step S1, the braking force adjusting function of the motor-generator 11 is determined by comparing a target regenerative braking force and the regenerative braking force that can be actually output by the motor-generator 11.

If it is computed that the target torque cannot be output from the motor-generator 11, it is determined in step S1 that "the driving force adjusting function of the motor-generator 11 has declined". If it is computed that the target regenerative braking force cannot be generated by the motor-generator 11, it is determined that the braking force adjusting function of the motor-generator 11 has declined. The method of calculating the target torque and the target regenerative braking force will be described below in conjunction with a third embodiment.

If after step S1, it is determined that the speed ratio of the transmission 5 is to be changed, a control based on the result of determination in step S1 is performed (step S2). Then, this control routine ends. The control of step S1 may be performed either before it is determined that the speed ratio of the transmission 5 is to be changed, or before a start of the speed shift following the determination that the speed ratio of the transmission 5 is to be changed.

The contents of step S1 and step S2 will be described below separately for a case where an acceleration request is present, and a case where a braking request is present.

[Case Where Acceleration Request is Present]

A control in a case where the shortfall of engine torque in response to an acceleration request is covered by torque from the motor-generator 11 will be described. In step S1, the driving force adjusting function of the motor-generator 11, that is, the possible output of the motor-generator 11, is determined. Examples of the condition for determining the possible output of the motor-generator 11 include the temperature of the motor-generator 11, the possible output (current, voltage) of the electricity storage 14, which supplies electric power to the motor-generator 11, etc. The possible output of the electricity storage 14 varies depending on the temperature of the electricity storage 14, the state of charge (SOC) thereof, etc., and is therefore determined on the basis of these factors.

After the possible output of the motor-generator 11 is determined in step S1 as described above, a speed shift vehicle speed for the transmission 5 is selected in step S2. That is, due to an output limit of the electricity storage 14, the motor-generator 11 has a characteristic that the maximum value of output torque decreases with increases in the rotation speed of the motor-generator 11. Therefore, the determination that the possible output of the motor-generator 11 has decreased in step S1 means that the maximum value of output torque of the motor-generator 11 has decreased. If in this situation, the torque transfer power of the clutch 7 decreases during a low-speed vehicle run, and a speed shift of the transmission 5 is performed, it is impossible to provide a necessary torque that needs to be produced by the motor-generator 11, so that the driving torque at the time of the speed shift decreases. In that case, a shock may occur.

Therefore, the speed shift vehicle speed that serves as a reference for reducing the speed ratio of the transmission 5 (an upshift reference or a speed shift point) is set at a lower speed if the possible output of the motor-generator 11 is below a predetermined value than if the possible output of the motor-generator 11 is above the predetermined value.

If this control is executed in step S2, the driving torque drops and the acceleration decreases at the time of the speed shift. As a countermeasure for this situation, a correction operation of increasing the engine torque and the engine rotation speed after the start of the speed shift is performed, and the clutch 7 is controlled to a semi-engaged state (slipping state). This control operation increases the driving torque. Therefore, it is possible to curb the reduction in the acceleration of the vehicle A1 and complete the speed shift of the transmission 5. Thus, the acceleration drop involved in an early speed shift can be reduced as much as possible, and therefore the discomfort to an occupant in the vehicle A1 can be minimized.

Next described will be an exemplary control that can be performed in step S2 if it is determined in step S1 that the possible output of the motor-generator 11 has decreased due to a low state of charge of the electricity storage 14. First, the alternator 10 is driven as an electric generator by power from the engine 3, and generated electric power is supplied to the motor-generator 11. Through this control, the reduction in the output torque of the motor-generator 11 can be curbed, and the reduction in the acceleration of the vehicle A1 involved in a speed shift can be curbed. If the electric power supplied to the motor-generator 11 is provided by coordination between the electricity storage 14 and the alternator 10, the electric power quota of the alternator 10 can be adjusted by increasing or decreasing the field current of the alternator 10 and thereby changing the generated voltage of the alternator 10.

[Case Where Braking Request is Present]

If the shortfall of the electric power supplied to the motor-generator 11 is covered by electric power generated by the alternator 10, the fuel economy of the engine 3 deteriorates. Therefore, if there is a braking request, for example, if the vehicle A1 is decelerating due to operation of the brake device 31 caused by depression of the brake pedal, or if the vehicle A1 is coasting after discontinuation of an acceleration request (the turning-off of the accelerator), regenerative braking can be effected by kinetic energy transferred from the rear wheels 2 to the motor-generator 11. In this case, it is necessary to control the sum of the engine brake force, the braking force produced by the brake device 31, and the regenerative braking force produced by the motor-generator 11, within such a range that an occupant in the vehicle A1 will not be discomforted. The sum of the engine brake force, the braking force produced by the brake device 31, and the regenerative braking force produced by the motor-generator 11 is computed with subtraction of the running resistance of the vehicle A1.

Next described will be an exemplary control that can be performed in step S2 in a case where a braking request is present, and where the determination that the speed ratio of the transmission 5 is to be changed is made, and where it is determined in step S1 that the braking force adjusting function of the motor-generator 11 has deteriorated. An example of the case where the braking force adjusting function of the motor-generator 11 deteriorates is a case where the amount of charge of the electricity storage 14 is greater than or equal to a predetermined value. In this exemplary control, mode switch is selectively performed among a first mode in which the clutch 7 is engaged, a second mode in which the clutch 7 is released, and a third mode in which the clutch 7 slips. The engagement of the clutch 7 means a state in which friction members of the clutch 7 rotate together as a unit. The release of the clutch 7 means a state in which the friction members of the clutch 7 are not in contact with each other and the friction members are rotatable with respect to each other. The slip of the clutch 7 means a state in which the friction members are in contact, and are rotatable with respect to each other.

(1) Case where Clutch 7 is Engaged

If there is a braking request, a target braking force is computed on the basis of the amount of depression of the brake pedal, and the regenerative braking force is controlled so that the target braking force is generated. If the target braking force cannot be reached by the regenerative braking force, the brake device 31 is actuated to achieve the target braking force. The target regenerative braking force is determined on the basis of the target braking force, the vehicle speed, the speed ratio of the transmission 5, the rotation speed of the front wheels 1, the stroke of the clutch 7, the engine rotation speed, the torque transfer power of the clutch 7, etc.

If the engine brake force is to be controlled, the supply of fuel is stopped in some cases, and is continued in some other cases. If a control in which the supply of fuel is stopped is executed, the engine brake force reaches a maximum. If regenerative braking force is produced by the motor-generator 11, the throttle valve 25 is controlled so as to reduce the engine brake force, and the motor-generator 11 is caused to produce an amount of power equivalent to the difference between the target braking force and the engine brake force.

If the throttle valve 25 is opened and the supply of fuel is stopped, the temperature of the catalyst provided in the exhaust system decreases, so that the emission control performance of the catalyst provided in the exhaust system may deteriorate. Therefore, if the catalyst temperature becomes lower than a predetermined threshold value (temperature) after the supply of fuel has been stopped and the ignition control has been stopped, a fall in the catalyst temperature can be avoided by opening the bypass valve 33 so as to control the inflow of relatively cold exhaust gas discharged from the engine 3 into the catalyst. As long as, during a fuel cut, the engine rotation speed is a rotation speed that allows autonomous operation of the engine 3, the engine rotation speed can be quickly brought close to a target rotation speed upon an acceleration request made after the braking request has dropped, merely by starting the supply of fuel to the engine 3 and the ignition control. In contrast, it is also possible to reduce the engine brake force by continuing the supply of fuel and the ignition control, and to cover the reduction in the engine brake force by the regenerative braking force produced by the motor-generator 11.

(2) Case where Clutch 7 is Released

In the case where the clutch 7 is released at the time of a speed shift of the transmission 5, no engine brake force is generated, and the regenerative braking force that can be achieved by the motor-generator 11 is determined in step S1. If in this case, the ignition control and the fuel injection control of the engine 3 are stopped, the engine rotation speed drops and then stops because kinetic energy is not transferred from the front wheels 1 to the engine 3.

If an acceleration request is made in the aforementioned case, it is necessary to perform the fuel injection control and the ignition control by driving the starter motor 27 so as to crank the engine 3. Therefore, there is a possibility that the engine starting characteristic becomes low and a vehicle occupant is discomforted, in comparison with a case where the engine rotation speed is greater than or equal to an autonomous rotation speed. Therefore, during a period until the engine output reaches a predetermined value, an assist control may be performed in which the motor-generator 11 is caused to function as an electric motor and torque of the motor-generator 11 is transferred to the rear wheels 2 so as to curb the reduction in acceleration.

(3) Case where Clutch 7 is Caused to Slip (Semi-Engaged)

If the clutch 7 is controlled to a semi-engaged state at the time of a speed shift of the transmission 5, engine brake force is produced. The speed ratio of the transmission 5 is controlled so as to satisfy the following condition: the engine rotation speed<the rotation speed of the front wheels 1×the speed ratio of the transmission 5×the speed ratio of the differential 34.

Then, the torque transfer power of the clutch 7 is controlled so that the engine rotation speed reaches a speed that is slightly higher than the idle speed. The torque transfer power of the clutch 7 is controlled to such a torque transfer power that the rotation speed of the engine 3, to which power of the front wheels 1 is transferred, can be kept at a low idle speed. At this time, the speed ratio of the transmission 5 is controlled so that the rotation speed difference between the friction members of the clutch 7 becomes minimized, since the power transfer loss of the clutch 7 decreases with decreases in the rotation speed difference between the friction members of the clutch 7.

During this operation, the motor-generator 11 regenerates a braking force that is determined by subtracting the torque that is needed in order to maintain the idle speed of the engine 3 from a deceleration-time target braking force. If the engine rotation speed is kept at or above a rotation speed that allows an autonomous engine operation without supply of fuel to the engine 3 in the above-described manner, the engine output can be quickly increased by the ignition control and the fuel injection control even in a case where an acceleration request is made. However, if the vehicle speed is high, the rotation speed difference between the friction members of the clutch 7 becomes great.

Thus, it is possible to select one of the first mode in which the clutch 7 is engaged, the second mode in which the clutch 7 is released, and the third mode in which the clutch 7 is semi-engaged. These modes are selectively entered on the basis of the vehicle speed, the state of charge of the electricity storage 14, etc. Selection of each of the modes will be described in conjunction with exemplary cases.

For example, if the amount of charge of the electricity storage 14 is less than or equal to a predetermined value, the second mode is selected. If the second mode is selected, no engine brake force is produced. Therefore, the amount of regeneration by power generation of the motor-generator 11 is the greatest. If the amount of charge of the electricity storage 14 is greater than or equal to a predetermined value, the third mode is selected.

Next described will be a case where the engine rotation speed becomes lower than the idling speed during the first mode. In this case, the clutch 7 is released, and a first control or a second control may be selected.

The first control is a control in which the fuel injection control and the ignition control are performed so as to cause an idling operation of the engine 3. The second control is a control in which the fuel injection control and the ignition control are stopped to stop the engine 3.

Next described will be a case where the amount of charge of the electricity storage 14 is greater than a predetermined value and the amount of power that can be charged into the electricity storage 14 is small. In this case, the mode is selectively switched between the first mode and the third mode, and the second mode is not selected. In a case where the electricity storage 14 is in a substantially fully charged state and therefore its acceptable electric power is little, the first mode is maintained.

Figure 4:
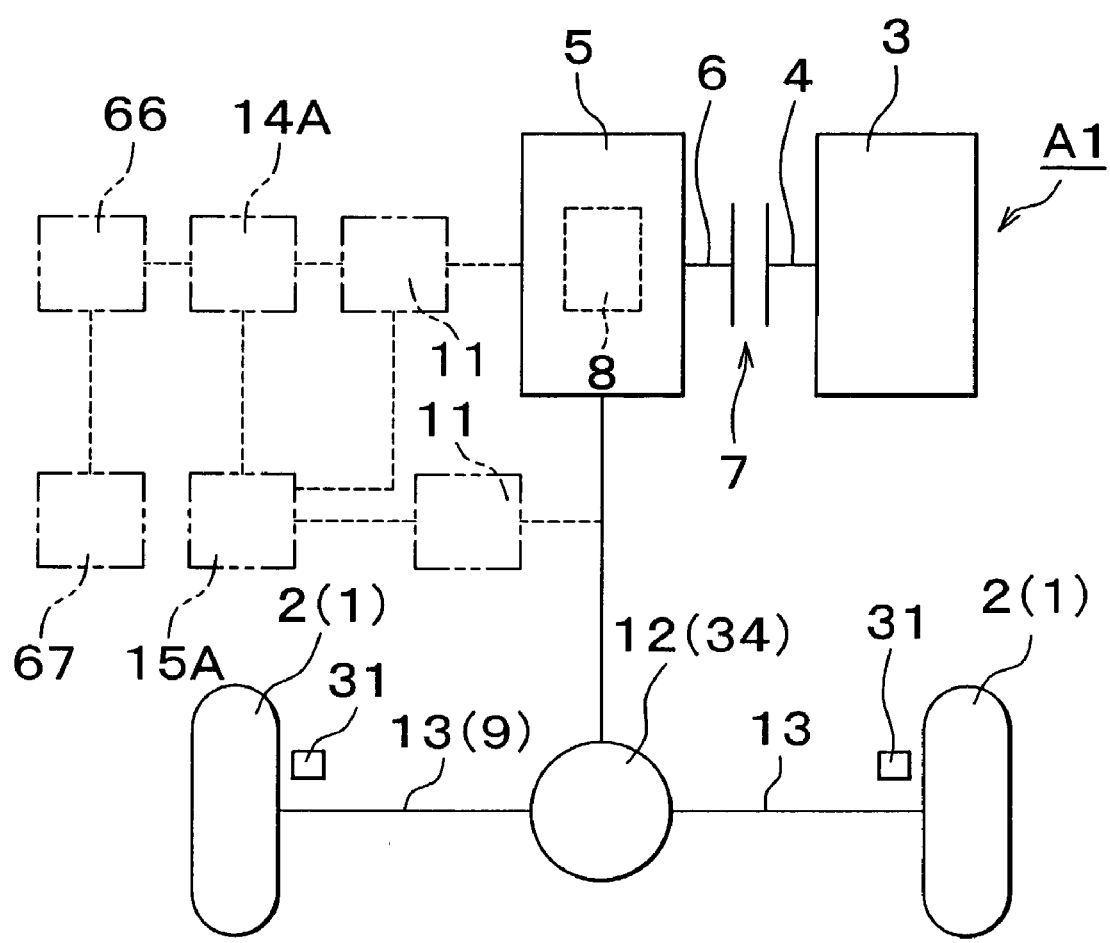
FIG. 4 is a conceptual drawing illustrating another exemplary vehicle to which the flowchart of FIG. 1 can be applied.

The exemplary controls described above with reference to FIG. 1, that is, the control of adjusting the driving force based on the acceleration request, and the control of adjusting the braking force based on the braking request, are also applicable to a vehicle A1 having a construction illustrated in FIG. 4. The vehicle A1 illustrated in FIG. 4 is a generally-termed two-wheel drive vehicle in which an engine 3 and a motor-generator 11 are connected to front wheels 1 alone or rear wheels alone.

For the vehicle A1 illustrated in FIG. 4, it is possible to select one of two layouts as an arrangement of the motor-generator 11. In the first layout, the motor-generator 11 is disposed in a power transfer path between a differential 12 (or a differential 34) and the rear wheels 2 (or the front wheels 1) so that power transfer via the motor-generator 11 is possible. In the second layout, the motor-generator 11 is connected to an arbitrary output shaft (not shown) provided in a transmission 5.

In FIG. 4, an electricity storage 14A is connected to one of the motor-generators 11 via an inverter 15A. The electricity storage 14A is connected to an accessory device 67 via a DC/DC converter 66. The voltage of power of the electricity storage 14A is reduced to a predetermined voltage before power is supplied from the electricity storage 14A to the accessory device 67. The voltage applied from the electricity storage 14A to the accessory device 67 (e.g., 12 V) is lower than the voltage applied from the electricity storage 14A to the motor-generator 11 (e.g., 288 V). The control system illustrated in FIG. 3 can be used for the vehicle A1 shown in FIG. 4 as well.

The correspondence between the functional means applied to the vehicle A1 illustrated in FIGS. 2 and 3 and the construction of the invention will be described. Step S1 corresponds to a function determination in the invention. Step S2 corresponds to a torque transfer power control and a speed shift vehicle speed select in the invention.

The correspondence between elements and items described with reference to FIGS. 1 to 4 and the construction of the invention will be described. The engine 3 corresponds to a driving force source in the invention. The front wheels 1 correspond to a drive wheel in the invention. The engine brake force corresponds to a braking force in the invention. The motor-generator 11, the inverter 15 and the electricity storage 14 correspond to a behavior control device in the invention. The upshift vehicle speed corresponds to a predetermined condition in the invention. The upshift (reduction of the speed ratio of the transmission 5) corresponds to a speed shift control in the invention.

[Second Embodiment]

An exemplary vehicle corresponding to a second embodiment will be described hereinafter with reference to FIG. 5. Constructions comparable to those shown in FIG. 2 are represented by comparable reference characters, and will not be described below. A vehicle A1 shown in FIG. 5 has a drive pinion shaft 40 that is connected to a ring gear (not shown) of a differential 12. A belt-type continuously variable transmission (CVT) 41 is provided.

The belt-type continuously variable transmission 41 has a first pulley 42, a second pulley 43, and a belt 44 provided around the first pulley 42 and the second pulley 43. The first pulley 42 is attached to a first shaft 45. The second pulley 43 is attached to a second shaft 46. Each of the first pulley 42 and the second pulley 43 has a groove (not shown) for receiving the belt 44. The groove widths of the two pulleys can be controlled separately from each other. A clutch 47 is provided for controlling the torque transfer power between the second shaft 46 and the drive pinion shaft 40.

A flywheel 48 is provided which is attached to a shaft 49. A clutch 50 is provided for controlling the torque transfer power between the shaft 49 and the first shaft 45. A control system of the vehicle A1 shown in FIG. 5 will be described with reference to FIG. 6. Constructions comparable to those shown in FIG. 3 are represented by comparable reference characters, and will not be described below.

An electronic control unit 16 receives input of various signals, such a signal from a differential rotation speed sensor 51 for detecting the rotation speed of the drive pinion shaft 40, a signal from a second shaft rotation speed sensor 52 for detecting the rotation speed of the second shaft 46, a signal from a first shaft rotation speed sensor 53 for detecting the rotation speed of the first shaft 45, a signal from a torque sensor 54 for detecting the torque transferred by the clutch 47, etc. The electronic control unit 16 outputs various signals, such as a signal for controlling an actuator 55 that controls the groove widths of the first pulley 42 and the second pulley 43 separately from each other, a signal for controlling an actuator 56 that controls the torque transfer power of the clutch 47, a signal for controlling an actuator 57 that controls the torque transfer power of the clutch 50, etc.

Figure 5:
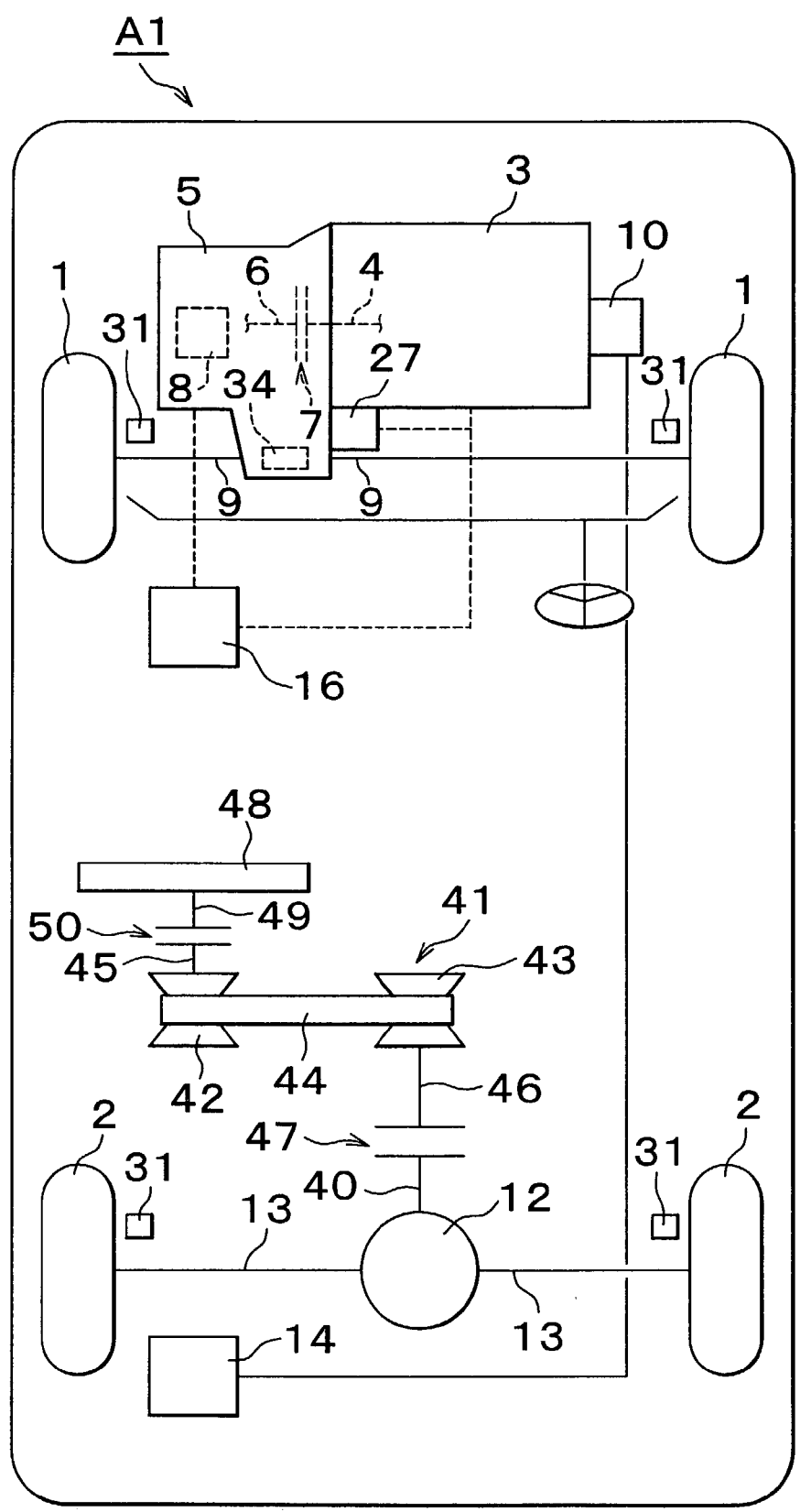
FIG. 5 is a conceptual drawing illustrating still another exemplary vehicle to which the flowchart of FIG. 1 can be applied.
Figure 6:
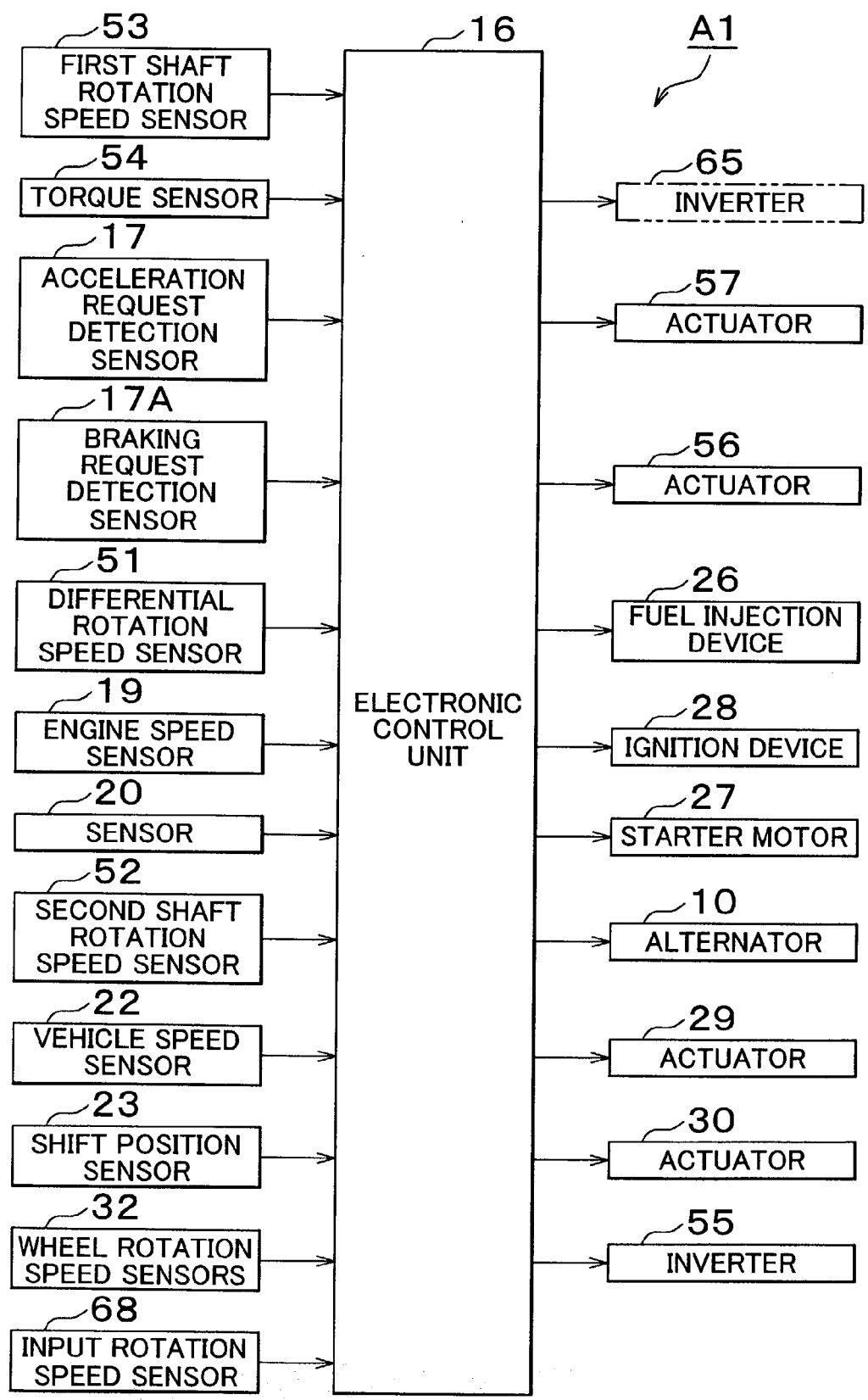
FIG. 6 is a block diagram illustrating a control system of the vehicle illustrated in FIG. 5.

In the vehicle A1 shown in FIG. 5, the constructions comparable to those shown in FIG. 2 perform functions comparable to the functions of the constructions of the vehicle A1 shown in FIG. 2. The vehicle A1 shown in FIG. 5 is able to perform a control in which the shortfall of the engine torque with respect to an acceleration request or the shortfall of the engine brake force and the braking force of the brake device 31 with respect to a braking request is substantially covered by a function of the flywheel 48. Below described will be a control in which the actual braking force is adjusted in relation to a target braking force by the function of the flywheel 48, a control in which the actual accelerating force is adjusted in relation to a target accelerating force by the function of the flywheel 48, and other controls.

[Control of Adjusting Target Braking Force]

If during a run of the vehicle A1, a braking request is present and a request for changing the speed shift of the transmission 5 is not present, the torque transfer power of each of the clutch 47 and the clutch 50 is increased to or above a predetermined value. As a result, kinetic energy of the rear wheels 2 is transferred to the flywheel 48 via the differential 12, the clutch 47 and the belt-type continuously variable transmission 41. The torque transfer power of the clutch 47 is controlled to a value that allows friction members of the clutch 47 to slip on each other (rotate relatively to each other) when a torque corresponding to the braking force of the vehicle A1 is transferred from the drive pinion shaft 40 to the second shaft 46. The torque transfer power of the clutch 50 is controlled to such a value that the rotation speed of the first pulley 42 and the rotation speed of the shaft 49 become equal to each other.

The speed ratio of the belt-type continuously variable transmission 41 is controlled so that the rotation speed No of the drive pinion shaft 40 and the rotation speed Ni of the second shaft 46 have the following relationship:

$$No > Ni + \alpha$$

where $\alpha$ is a coefficient.

The speed ratio of the belt-type continuously variable transmission 41 means the ratio between the rotation speed of the first pulley 42 and the rotation speed of the second pulley 43. In FIG. 5, the speed ratio of the belt-type continuously variable transmission 41 is controlled by adjusting the running radii of the belt 44 on the first pulley 42 and the second pulley 43.

Through the above-described control, a torque corresponding to the braking force of the vehicle A1 is transferred to the flywheel 48 via the clutch 47 and the belt-type continuously variable transmission 41. That is, inertia energy of the vehicle A1 is stored by the flywheel 48. It is to be noted that if the speed ratio of the belt-type continuously variable transmission 41 is controlled at a fixed ratio, the rotation speed of the flywheel 48 reaches an increase termination and the storage of energy to the flywheel 48 ends at the time of satisfaction of:

No=Ni

In order to prevent this, the speed ratio of the belt-type continuously variable transmission 41 is controlled so that the condition:

No>Ni+α is maintained even if the rotation speed of the flywheel 48 increases.

If the coefficient α is increased to or above a predetermined value, the difference between the rotation speed of the drive pinion shaft 40 and the rotation speed of the second shaft 46 becomes great, so that the power loss caused by slip of the clutch 47 may become great. In order to avoid this drawback, the magnitude of the factor α is set within the range of 10% to 20% of the rotation speed of the second shaft 46. It is desirable to set the coefficient α as small as possible if the response speed of shifting the speed ratio of the belt-type continuously variable transmission 41 is greater than the changing speed of the rotation speed of the flywheel 48.

The magnitude of torque transferred to the flywheel 48 can be controlled by adjusting the torque transfer power of the clutch 47. As the torque transfer power of the clutch 47 increases, the torque transferred to the flywheel 48 becomes greater, and energy is stored to the flywheel 48 in a shorter time. Thus, on the basis of the operation of storing kinetic energy of the rear wheels 2 to the flywheel 48, the rear wheels 2 receive negative torque, that is, braking force. That is, the actual braking force in response to a target braking request based on the signal from the braking request detection sensor 17A and data stored in the electronic control unit 16 can be supplemented by the function of the flywheel 48, whereby the decelerating state of the vehicle A1 can be controlled.

Thus, in the case where braking force is provided for the rear wheels 2 by the function of the flywheel 48 so that the vehicle A1 decelerates, and kinetic energy is transferred to the alternator 10 for regenerative electric power generation, or in the case where during a downhill run of the vehicle A1, potential energy of the vehicle A1 is transferred to the alternator 10 for regenerative electric power generation, the running resistance of the vehicle A1 and the braking force produced by the function of the flywheel 48 are balanced so as to control the braking force sharing between the front wheels and the rear wheels and thereby stabilize the vehicle behavior.

In some cases where the vehicle A1 is coasting with engine brake force being produced, a control may be performed in which the torque transfer power of the clutch 7 is reduced and the speed ratio of the transmission 5 is changed, and after that, the torque transfer power of the clutch 7 is increased. While the torque transfer power of the clutch 7 is reduced in this manner, the engine brake force decreases, thus incurring the possibility of discomforting an occupant in the vehicle A1.

This drawback can be avoided in the following manner. That is, at the time of reducing the torque transfer power of the clutch 7, the torque transfer power of the clutch 47 is increased to apply a braking force to the rear wheels 2 through the function of the flywheel 48 so as to adjust the braking force that acts on the entire vehicle A1. However, if the braking force adjusting function of the flywheel 48 has decreased, there is a possibility that a braking force that needs to be provided by the flywheel 48 will not be achieved at the time of a speed shift of the transmission 5. This drawback can be avoided by the exemplary control illustrated in FIG. 1.

First, in step S1, the braking force adjusting function of the flywheel 48 is determined. For example, if the rotation speed of the flywheel 48 is close to an upper limit rotation speed, the braking force adjusting function of the flywheel 48 decreases because the rotation speed of the flywheel 48 cannot be further increased. Subsequently in step S2, a control of changing the magnitude of decrease in the torque transfer power of the clutch 7 or a control of changing the speed shift vehicle speed for the transmission 5 or the like is performed on the basis of a result of determination provided in step S1. In this manner, even if the braking force adjusting function of the flywheel 48 has decreased, it is possible to substantially prevent a sharp change in the braking force applied to the vehicle A1 and avoid discomforting a vehicle occupant.

[Case where Target Acceleration Force is Adjusted]

In the above-described case where the vehicle A1 is running, and where engine torque is transferred to the front wheels 1, and where the torque transfer power of the clutch 7 is reduced in conjunction with a speed shift of the transmission 5, there is a possibility of insufficient actual acceleration force with respect to a target acceleration force. If in this case, there is energy stored in the flywheel 48, a control of adjusting the acceleration force can be performed by transferring energy from the flywheel 48 to the rear wheels 2.

That is, at the time of reducing the torque transfer power of the clutch 7 in conjunction with a speed shift of the transmission 5, the torque transfer power of each of the clutches 50, 47 is increased to or above a predetermined value. As a result, a torque corresponding to the energy stored in the flywheel 48 is transferred to the rear wheels 2 via the belt-type continuously variable transmission 41 and the differential 12.

In this case, the speed ratio of the belt-type continuously variable transmission 41 is controlled so as to satisfy No+α<Ni.

When the speed ratio of the transmission 5 is shifted, a target torque that needs to be transferred from the flywheel 48 to the rear wheels 2 is determined. Then, on the basis of the target torque, the engaging pressure of the clutch 47 is controlled. In this case, it is possible to detect the actual transfer torque of the clutch 47 via the torque sensor 54, and to compare the detected torque value with the target transfer torque of the clutch 47, and to feedback-control the engaging pressure of the clutch 47 so that the deviation of the detected result from the target transfer torque of the clutch 47 decreases. If the possible changing speed of the speed ratio of the belt-type continuously variable transmission 41 is greater than the changing speed of the rotation speed of the flywheel 48, it is preferable to set the coefficient α at a smallest-possible value.

In the case where the shortfall of the target acceleration force is to be covered by the function of the flywheel 48, the exemplary control of FIG. 1 may be applied. That is, in step S1, the acceleration force adjusting function of the flywheel 48 is determined. For example, the acceleration force adjusting function of the flywheel 48 is determined on the basis of the energy stored in the flywheel 48, and the target torque that needs to be transferred from the flywheel 48 to the rear wheels 2. Then in step S2, a control of the torque transfer power of the clutch 7 or selection of a speed shift vehicle speed for the transmission 5 is performed on the basis of a result of determination provided in step S1.

The speed shift vehicle speed for the transmission 5 corresponding to the case where it is determined in step S1 that the acceleration adjusting function has decreased is set lower than the speed shift vehicle speed for the transmission 5 corresponding to the case where it is determined in step S1 that the acceleration adjusting function has not decreased.

[Other Controls]

If there is no need to supplement the target braking force or the target acceleration force through the function of the flywheel 48, the clutch 47 is fully released. If the clutch 50 is engaged during a state where energy has been stored in the flywheel 48, an energy loss occurs in the belt-type continuously variable transmission 41 despite the full release of the clutch 47. The energy loss includes the windage loss (loss by air resistance) due to rotation of the first pulley 42 and the second pulley 43, the friction loss occurring between the belt 44 and the first and second pulleys 42, 43, the friction loss of a bearing portion of the first shaft 45, the friction loss of a bearing portion of the second shaft 46, the friction loss of a bearing portion that supports the shaft 49, etc. In the case where the clutch 47 is fully released, dissipation of energy of the flywheel 48 can be reduced by fully releasing the clutch 50. The vehicle A1 of FIG. 5 may adopt a construction in which the clutch 50 is omitted.

The correspondence between the construction shown in FIG. 5 the construction of the invention will be described. The flywheel 48, the clutch 50, the shaft 49, the first shaft 45, the first pulley 42, the belt 44, the second pulley 43, the second shaft 46, and the clutch 47 correspond to a behavior control device in the invention. The rear wheels 2 correspond to a wheel in the invention. The correspondence of other constructions shown in FIGS. 5 and 6 to constructions in the invention is substantially the same as the correspondence of comparable constructions to constructions in the invention.

[Other Exemplary Constructions]

Figure 7:
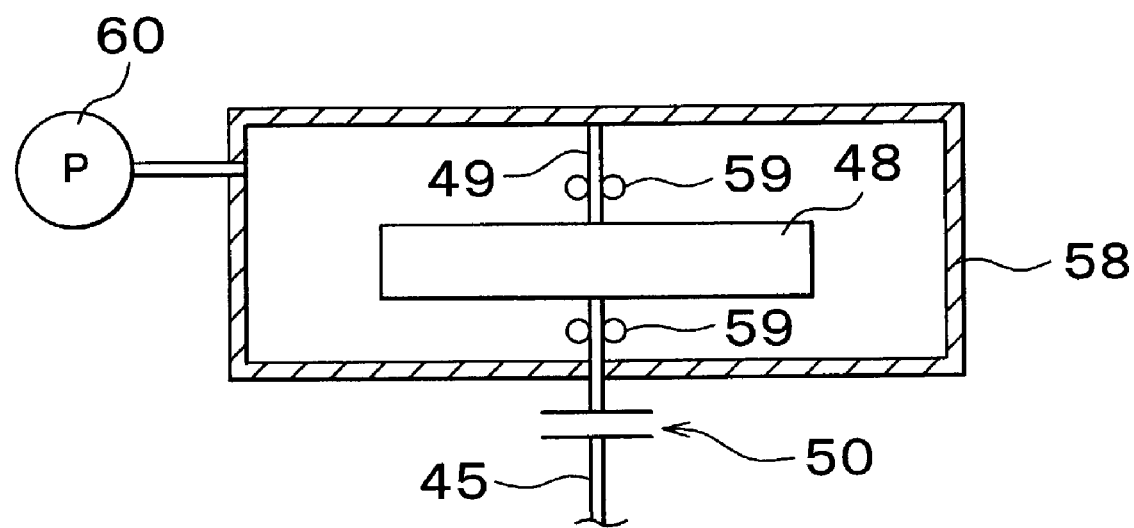
FIG. 7 is a sectional view of another exemplary construction of a flywheel illustrated in FIG. 5.

The mechanical loss of the flywheel 48 (windage loss and bearing loss) cannot be avoided even if the clutch 50 is fully released. FIG. 7 shows an exemplary construction for reducing the windage loss of the flywheel 48 of the mechanical loss thereof. In FIG. 7, the flywheel 48 and the shaft 49 are provided within a vacuum container 58. An end of the shaft 49 is disposed outside the vacuum container 58. The clutch 50 is disposed between the outside end of the shaft 49 and the first shaft 45. A bearing 59 that rotatably supports the shaft 49 is provided. If the bearing 59 is a bearing having a structure in which ceramic ball bearings are lubricated with grease, or in which a bearing having a structure in which lubricant is dripped, the lubricant agitation loss can be considerably reduced. A vacuum pump 60 that reduces the pressure in the vacuum container 58 is provided. Further provided is a labyrinth seal or a magnetic fluid seal or the like for sealing between the shaft 49 and an inner peripheral surface of a shaft hole of the vacuum container 58.

Figure 14:
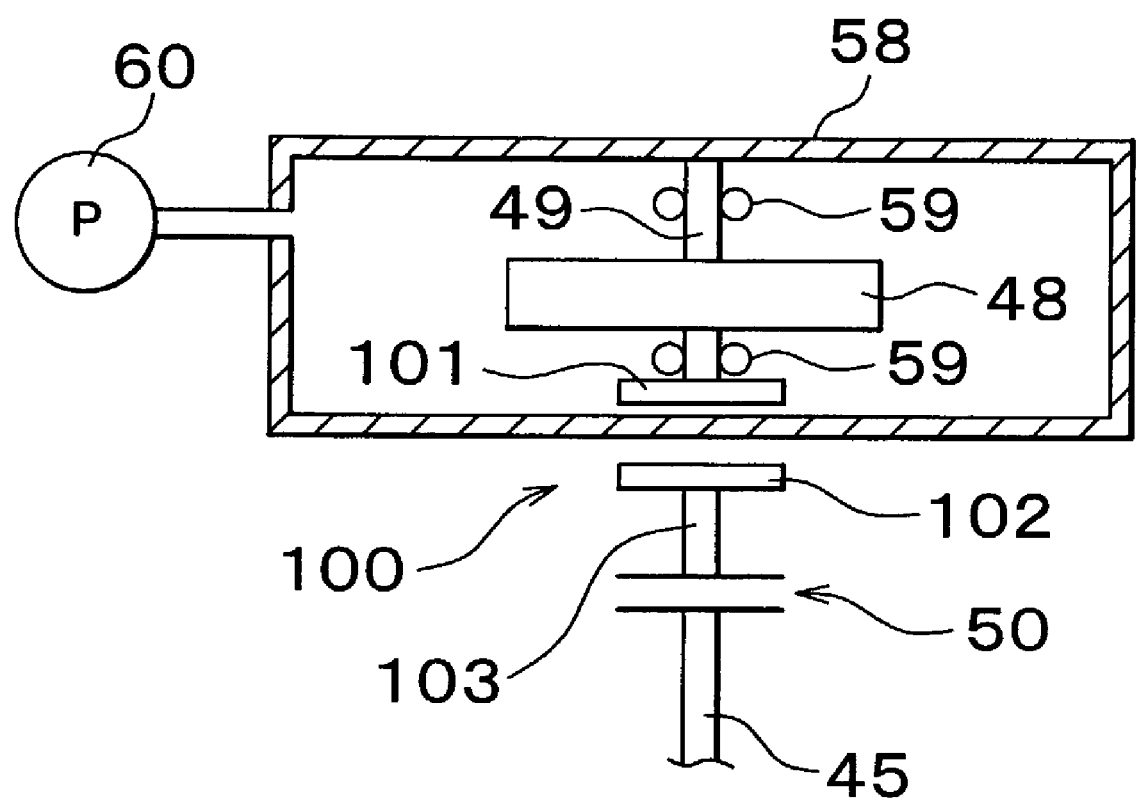
FIG. 14 is a sectional view illustrating another exemplary construction of the flywheel shown in FIG. 5.

An exemplary structure different from the structure shown in FIG. 7 is shown in FIG. 14. Constructions in FIG. 14 comparable to those shown in FIG. 7 are represented by comparable reference numerals, and will be described below. In FIG. 14, a third shaft 103 is provided which is connected to and disconnected from the clutch 50 via the first shaft 45. The third shaft 103 is disposed outside the vacuum container 58. The shaft 49 is disposed entirely within the flywheel 48. A magnetic coupling 100 for power transfer between the shaft 49 and the third shaft 103 is provided. The magnetic coupling 100 has a plate 101 provided at the shaft 49-side, and a plate 102 provided at the third shaft 103-side. Since the magnetic coupling 100 performs power transfer based on magnetic force, a material that does not affect magnetic force is selected as a material of the vacuum container 58.

As the flywheel 48 is disposed within the vacuum container 58 in the above-described fashion, it is possible to reduce the increase in windage loss in conjunction with rotation of the flywheel 48 in a case where the flywheel 48 with energy stored rotates. According to the embodiment shown in FIG. 14, the degree of vacuum of the vacuum container 58 can be easily increased, so that the electric power needed to drive the vacuum pump 60 can be considerably reduced.

In the systems shown in FIGS. 5, 7 and 14, energy of the vacuum container 58 can be used as an assist for achieving the target acceleration force. However, energy stored in the flywheel 48 gradually decreases since there is friction loss of the bearing 59 of the shaft 49. Therefore, there is a possibility of the flywheel 48 having no stored energy when there arises a need for the assist with energy of the flywheel 48 for the purpose of achieving the target acceleration force.

Figure 8:
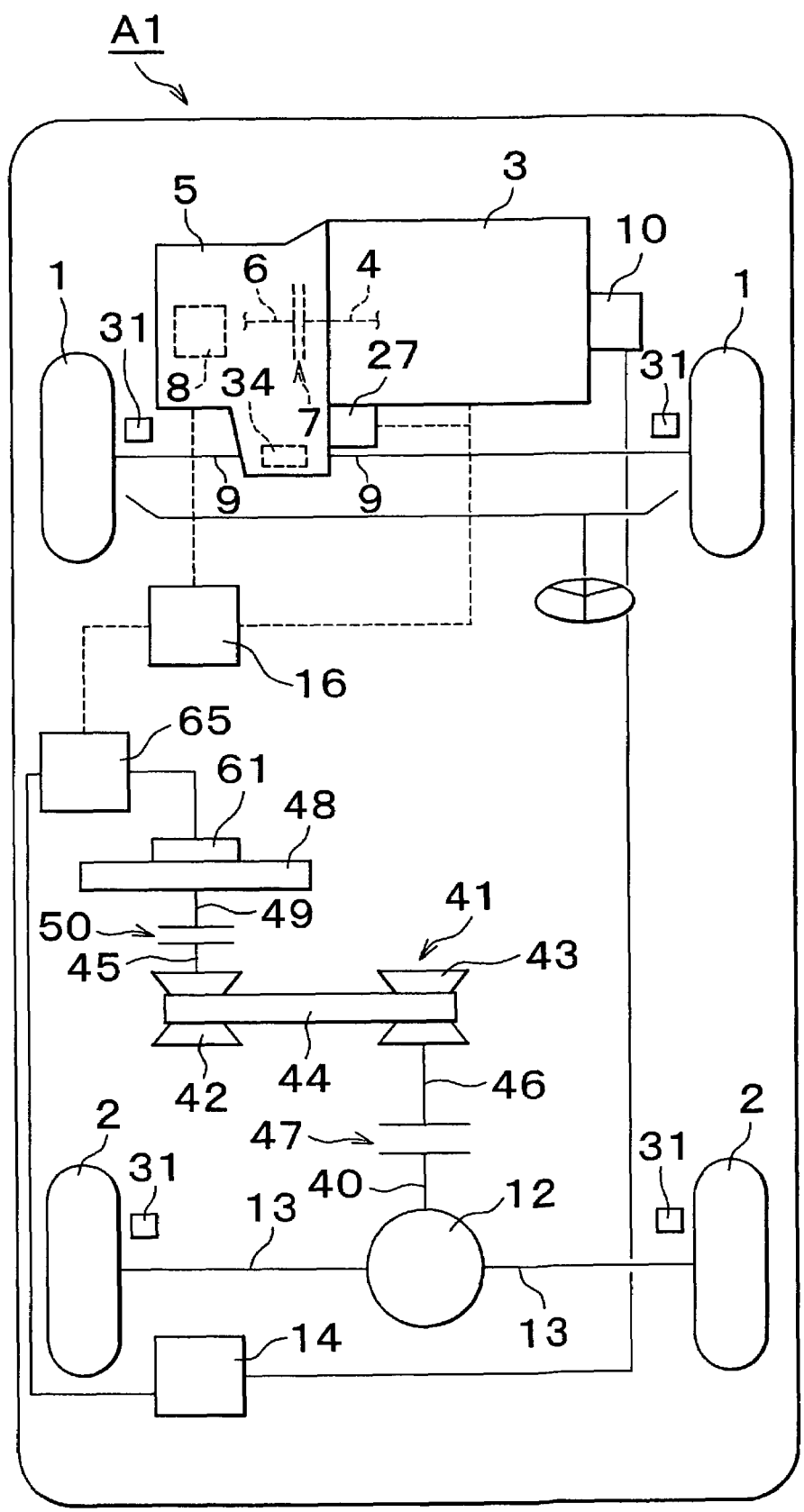
FIG. 8 is a conceptual diagram illustrating another exemplary vehicle to which the flowchart of FIG. 1 can be applied.
Figure 9:
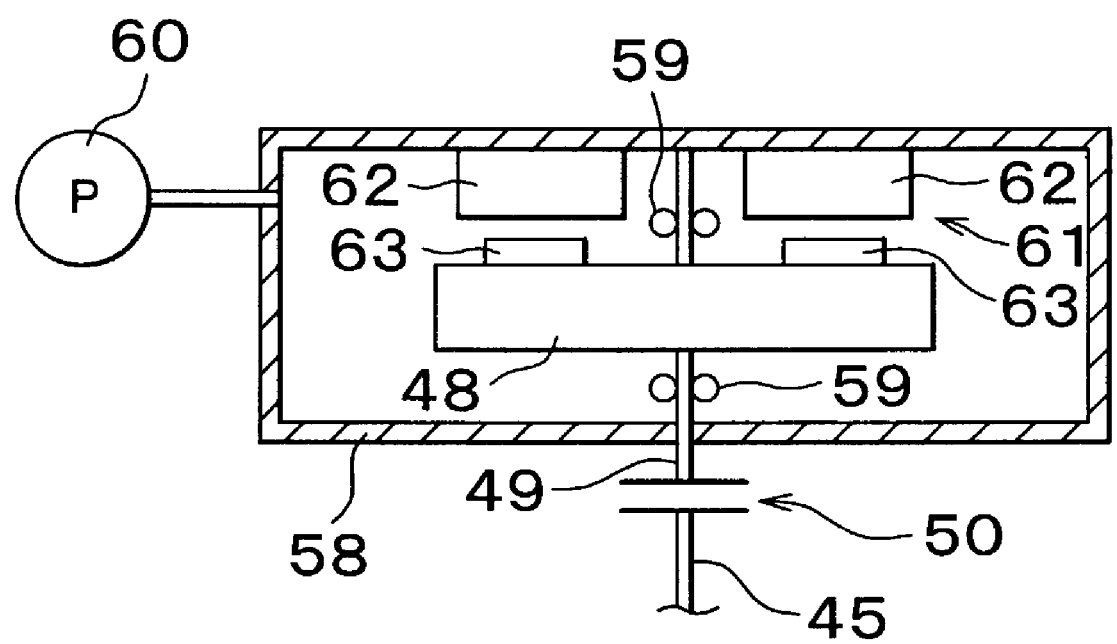
FIG. 9 is a sectional view illustrating a construction of a flywheel and a motor-generator shown in FIG. 8.

An exemplary construction capable of coping with the aforementioned drawback is shown in FIGS. 8 and 9. In this construction, a flywheel 48 and a motor-generator 61 are provided side by side in the direction of an axis of the shaft 49. The motor-generator 61 has fixed windings 62 and basket-shaped rotors 63. The fixed windings 62 are attached to the vacuum container 58, and the basket-shaped rotors 63 are attached to the flywheel 48. Three-phase connection wires are formed for the basket-shaped rotors 63, and the connection wires are connected to an inverter 65.

The motor-generator 61 is a generally-termed three-phase basket-type induction motor. The inverter 65 is electrically connected to the electricity storage 14. The inverter 65 is also connected to the electronic control unit 16 so as to allow signal communication therebetween. The torque of the motor-generator 61 is controlled through VVVF or a vector control by the inverter 65. The VVVF is a variable-voltage variable-frequency control that utilizes a fact that the torque of the motor-generator 61 is determined by a certain function (a function of voltage, frequency, etc.). The vector control is a control in which the magnetic flux of the fixed windings 62 for generating induction voltage for the basket-shaped rotors 63 is kept in a predetermined state (angle, magnitude) so as to perform a control similar to a control performed in a DC motor. The motor-generator 61 may be a PM (permanent magnet type) motor, an SYR (synchronous reluctance) motor, an SR (switched reluctance) motor, etc.

Other constructions shown in FIG. 8 are substantially the same as those shown in FIGS. 2 and 5, and other constructions shown in FIG. 9 are substantially the same as those shown in FIG. 7. The control systems shown in FIGS. 8 and 9 are substantially the same as those described above, except that in FIG. 6, the electronic control unit 16 outputs a signal for controlling the inverter 65.

With regard to the vehicle A1 shown in FIG. 8, constructions substantially the same as those shown in FIGS. 2, 3, 5 and 7 achieve the same advantages as in FIGS. 2, 3, 5 and 7. In FIGS. 8 and 9, by increasing the torque transfer power of each of the clutches 47, 50 to or above a predetermined value, it becomes possible to store kinetic energy of the rear wheels 2 to the flywheel 48 via the belt-type continuously variable transmission 41. Furthermore, during rotation of the flywheel 48, the motor-generator 61 can be caused to function as an electric generator, and generated electric power can be stored into the electricity storage 14 via the inverter 65.

Described below will be a case where the energy stored in the flywheel 48 is low so that energy from the flywheel 48 is used as a supplement to achieve the target acceleration force. In this case, the motor-generator 61 is caused to function as an electric motor by supplying electric power from the electricity storage 14 to the motor-generator 61 via the inverter 65.

As a result, torque of the motor-generator 61 is transferred to the flywheel 48 so that the shortfall from the target torque that needs to be provided by the flywheel 48 can be covered by the torque from the motor-generator 61. That is, in a case where the acceleration force is adjusted by transferring torque to the rear wheels 2, both a torque corresponding to the energy stored in the flywheel 48 and a torque output from the motor-generator 61 can be transferred to the rear wheels 2. Therefore, the reduction in the acceleration of the vehicle A1 can be more reliably curbed.

Next described will be a case where the rotation speed of the flywheel 48 is an upper-limit rotation speed and therefore it is no longer possible to store kinetic energy from the rear wheels 2 to the flywheel 48. In this case, the motor-generator 61 is used to perform regenerative power generation, and the thus-generated electric power is stored into the electricity storage 14. Furthermore, if kinetic energy that the vehicle A1 has during running is converted into electric energy, and is stored into the electricity storage 14, energy can be stored into the electricity storage 14 without waste of the energy transferred from the rear wheels 2 to the flywheel 48 in the form of thermal energy due to friction loss on bearings, windage loss, etc. Therefore, energy can be retained even during a stop of the vehicle A1.

The correspondence between constructions shown in FIG. 8 and constructions in the invention will be described. The motor-generator 61, the inverter 65 and the electricity storage 14 correspond to an energy conversion device in the invention. The correspondence between other constructions shown in FIG. 8 and constructions in the invention is substantially the same as the correspondence between constructions shown in FIGS. 2 and 5 and constructions in the invention.

[Third Embodiment]

A third embodiment is concerned with an exemplary method of calculating a target regenerative braking force and a target torque of the motor-generator 11 that is performed in step S1 in FIG. 1. The third embodiment is applicable to, for example, the vehicle A1 shown in FIG. 4.

An overall construction of the control of the third embodiment will be described with reference to the flowchart shown in FIG. 10. First, in step S11, states of the vehicle A1 is determined. In step S11, (1) a torque generated by the engine 3, (2) a transfer coefficient of the clutch 7, and (3) a driving force of the vehicle A1 provided by the engine torque are calculated. The item (1) is calculated on the basis of the engine speed, and the amount of intake air. The item (2) is calculated on the basis of the torque transfer power (engagement pressure) of the clutch 7, the friction coefficients of friction members of the clutch 7, etc. The item (3) is calculated by multiplying the item (1), the item (2), and the speed reducing ratio between the engine 3 and the front wheels 1 (or the rear wheels 2). The speed reducing ratio between the engine 3 and the front wheels 1 (or the rear wheels 2) includes the speed ratio of the transmission 5, and the speed reducing ratio of the differential 12 (or the differential 34).

Subsequently to step S11, it is determined whether there is a request to shift the speed ratio of the transmission 5 (step S12). The determination at step S12 is made on the basis of the vehicle speed, the amount of accelerator operation, the shift position, etc. The shift determined in step S12 may be an upshift during acceleration or a downshift during deceleration.

If the determination at step S12 is affirmatively made, "(4) a driving force of the vehicle A1 occurring at the time point of completion of a control of changing the speed ratio of the transmission 5 from the present speed ratio to a different speed ratio" is estimated (step S13). In step S13, the driving force of the vehicle A1 corresponding to the engine torque occurring at the time of completion of the speed shift is estimated on the basis of the vehicle speed, the speed ratio after the speed shift, the degree of acceleration request (e.g., the amount of depression of the accelerator pedal), etc.

Subsequently to step S13, "(5) a target driving force of the vehicle A1" is calculated (step S14). More specifically, in step S14, the target torque that needs to be transferred to the front wheels 1 (or the rear wheels 2) is calculated so as to bring the present driving force of the vehicle A1 closer to the vehicle driving force (4). It is possible to include "a change in the acceleration request occurring during the speed shift of the transmission 5" as a parameter for calculating the target torque.

In step S15, a state of control of the motor-generator 11 is calculated on the basis of steps S11 to S14. After that, the control routine ends. In step S15, "(6) a driving force that needs to be covered by the output from the motor-generator 11, of the driving force of the vehicle A1" and "(7) a torque of the motor-generator 11 corresponding to the item (6)" are calculated. The item (6) is determined by subtracting the item (3) from the item (5). The item (7) is determined by dividing the item (6) by the speed reducing ratio of a path from the motor-generator 11 to the front wheels 1 (or the rear wheels 2). If the determination at step S12 is negatively made, the item (3) and the item (4) are set equal to the item (5), and the item (6) and the item (7) are set at "zero" (step S16). After that, the control routine ends.

Figure 10:
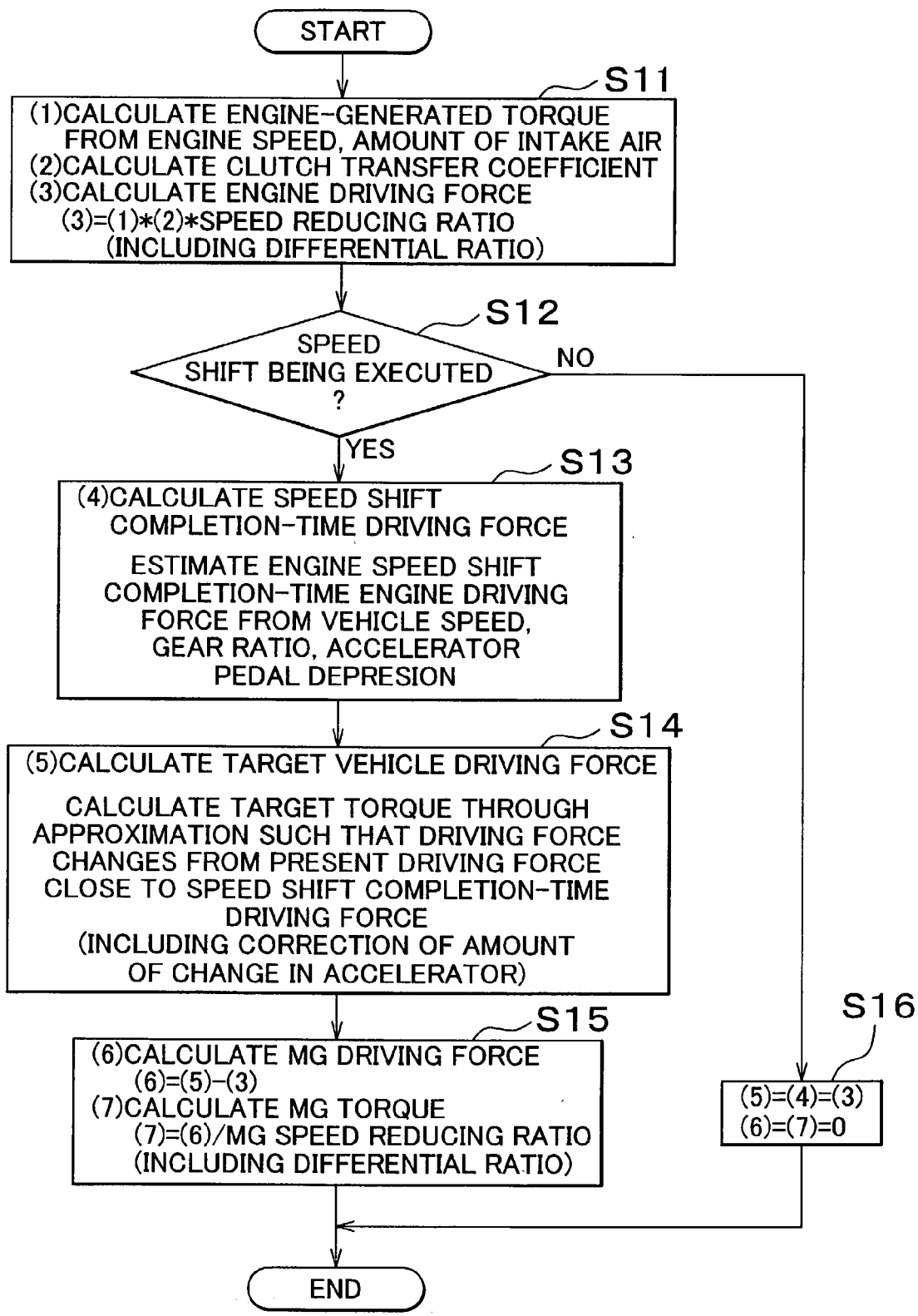
FIG. 10 is a flowchart illustrating an exemplary vehicle control apparatus.

The exemplary control illustrated in FIG. 10 is applicable to both the case of acceleration and the case of deceleration. If a condition for an upshift is satisfied during acceleration, the engine output is limited by limiting the increase in the degree of opening of the throttle valve 25. The content of an operation performed for a downshift during deceleration will be described. Generally, in a case where during deceleration, the amount of accelerator operation is at a completely closed state and the engine rotation speed is at or above a predetermined speed, fuel is not supplied to the engine 3. Therefore, in that case, power of the front wheels 1 is transferred to the engine 3, thus producing engine brake force. Then, the clutch 7 is released, and a downshift is performed. After that, the clutch 7 is engaged.

That is, as the clutch 7 is released, engine brake force temporarily disappears. Upon engagement of the clutch 7, engine brake force is generated again. In this manner, the deceleration of the vehicle A1 changes. The change in the deceleration is particularly great at the time of a manual downshift. Therefore, in the exemplary control illustrated in FIG. 10, the reduction in engine brake force occurring at the time of a downshift is covered by the regenerative braking force of the motor-generator 11, so as to curb the change in the deceleration of the vehicle A1.

If the vehicle speed is low and the engine rotation speed is near the idling rotation speed, it becomes necessary to perform limitation of the regenerative braking torque of the motor-generator 11 and a damping correction thereof in accordance with the vehicle speed, due to continuation of a released state of the clutch 7. The damping correction is a control of gradually decreasing the regenerative braking torque corresponding to the engine brake force with elapse of time. The engine rotation speed being close to the idling rotation speed normally means a case where the engine rotation speed is lower than the idling rotation speed, but also includes a case where the engine rotation speed is slightly higher than the idling rotation speed in order to secure the rotation stability of the engine 3.

Figure 11:
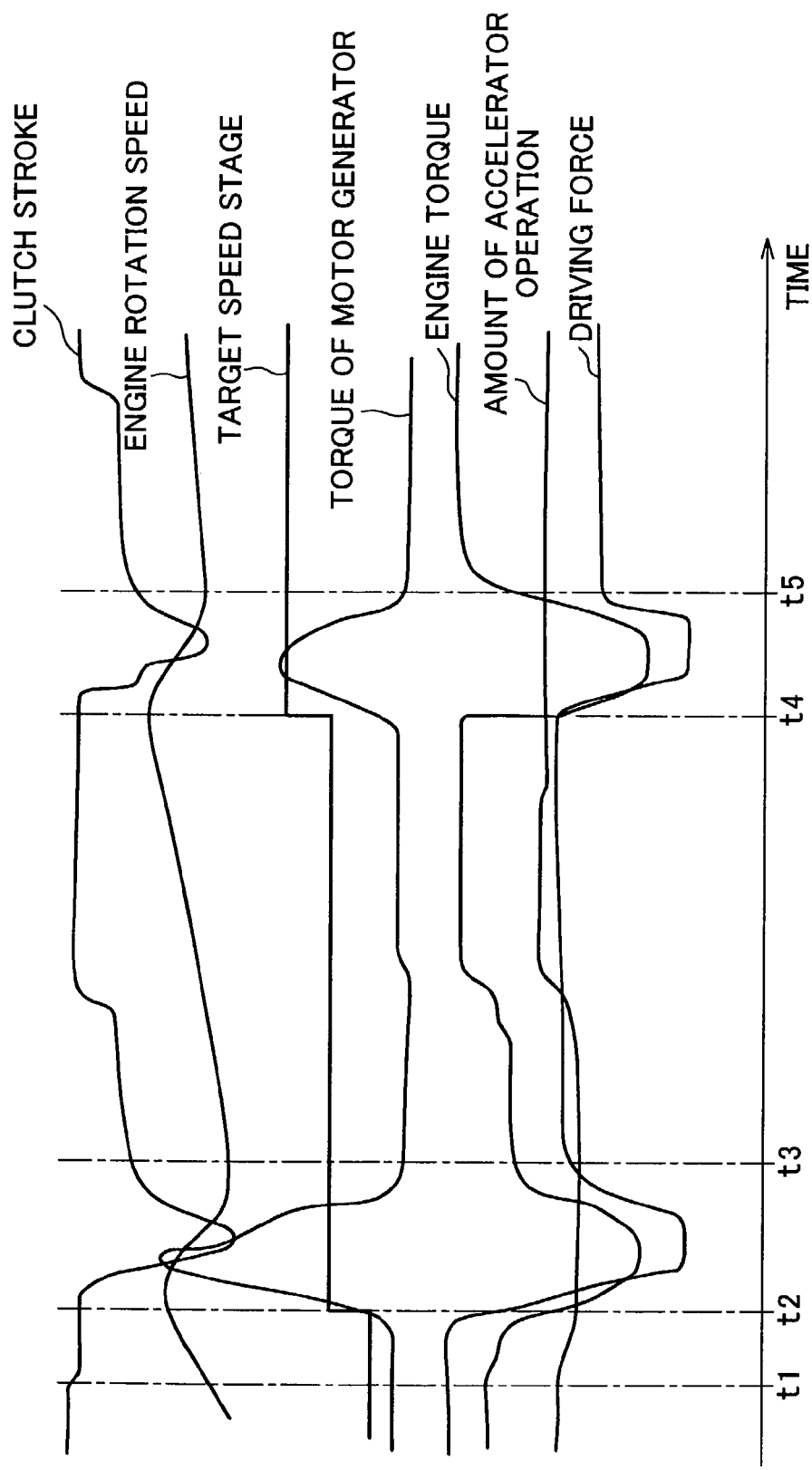
FIG. 11 is an exemplary time chart corresponding to the flowchart of FIG. 10.

FIG. 11 is an exemplary time chart for a case where an upshift is performed during a state where the amount of accelerator operation is substantially constant. This time chart indicates time-dependent changes in the stroke of the clutch 7, the engine rotation speed, the target speed ratio (i.e., target speed stage), the torque of the motor-generator 11, the engine torque, the amount of accelerator operation, and the driving force of the vehicle A1 corresponding to the engine torque. As for the clutch stroke, upward changes in FIG. 11 mean increases in the torque transfer power. As for the engine rotation speed, upward changes in FIG. 11 mean increases in the engine rotation speed. As for the torque of the motor-generator 11, upward changes in FIG. 11 mean increases in the torque. As for the engine torque, upward changes in FIG. 11 mean increases in the engine torque. As for the amount of accelerator operation, upward changes in FIG. 11 mean increases in the amount of accelerator operation. As for the vehicle driving force, upward change in FIG. 11 mean increases in the driving force.

At a time point t1, the target speed stage is the 1st speed, and the clutch 7 is in the engaged state. The engine speed is increasing with increases in the vehicle speed. At a time point t2, the target speed stage is changed from the 1st speed to the 2nd speed and the upshift is started on the basis of the vehicle speed, the amount of accelerator operation, etc. Furthermore, as the torque transfer power of the clutch 7 is reduced, the engine rotation speed and the engine torque decrease, and the driving force corresponding to the engine torque also decreases. In contrast, the torque of the motor-generator 11 increases, and then decreases. The engine torque starts increasing. At a time point t3 when the upshift is completed, the engine rotation speed starts to increase again with increases in the vehicle speed. The torque of the motor-generator 11 is kept low.

Then, at a time point t4 when the target speed stage is changed from the 2nd speed to the 3rd speed, the engine torque is reduced, and the torque transfer power of the clutch 7 is reduced, and the upshift is started, and the torque of the motor-generator 11 is increased. As the upshift progresses, the engine rotation speed decreases, and the driving force corresponding to the engine torque also decreases.

After that, the torque of the motor-generator 11 is reduced, and the torque transfer power of the clutch 7 is increased, and the engine torque is increased. At a time point t5, the engine rotation speed becomes synchronous with the rotation speed corresponding to the 3rd speed, thus ending the upshift. After that, the engine torque is controlled to a substantially constant torque, and the driving force corresponding to the engine torque also becomes constant, and the torque of the motor-generator 11 is controlled to a substantially constant torque.

Figure 12:
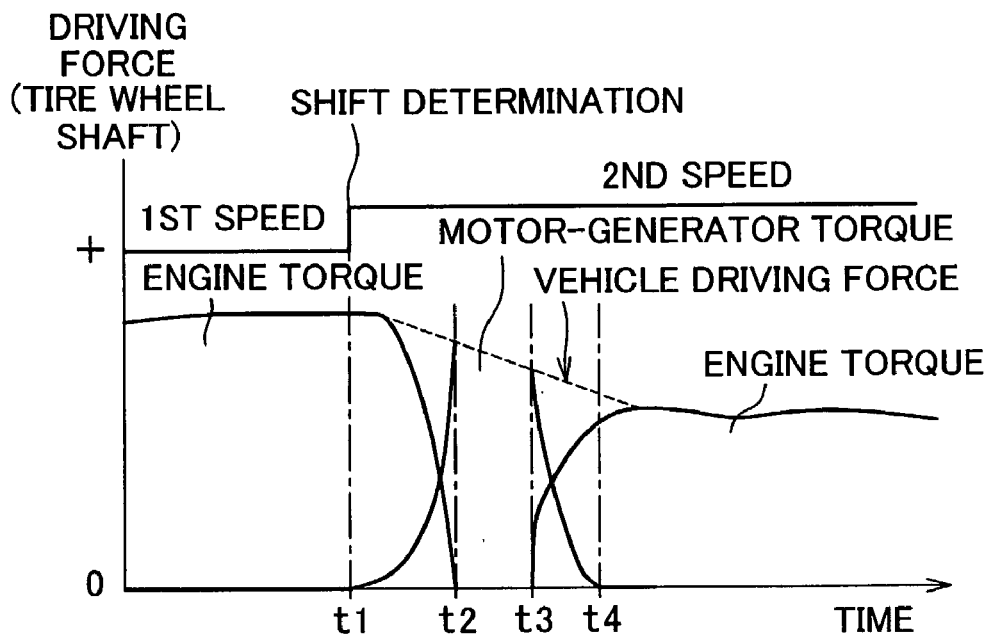
FIG. 12 is an exemplary time chart corresponding to the flowchart of FIG. 10.

FIG. 12 is a time chart indicating changes in the driving force of the vehicle A1 in a case where an upshift is performed during acceleration. Referring to FIG. 12, while the selected speed is the 1st speed, a positive driving force (i.e., an acceleration force) is provided by engine torque, and no motor-generator torque is generated. At a time point t1 when a determination to perform an upshift from the 1st speed to the 2nd speed is made, the torque of the motor-generator is increased while the engine torque is reduced. That is, the vehicle driving force is provided by the torque of the engine and the torque of the motor-generator 11. At a time point t2 when the clutch 7 is completely released, engine torque is no longer transferred to the front wheels 1. Therefore, the vehicle driving force is provided by the torque of the motor-generator 11.

Then, at a time point t3, the torque of the motor-generator 11 starts to decrease, and the torque transfer power of the clutch 7 is increased so that transfer of engine torque to the front wheels 1 starts. That is, the vehicle driving force is provided by the torque of the motor-generator 11 and the torque of the engine. Then, at a time point t4, the torque of the motor-generator 11 is controlled to or below a predetermined value (zero), and the vehicle driving force is provided solely by the engine torque. The time points mentioned in the description of FIG. 12 have no correspondence to the time points mentioned in the description of FIG. 11.

Figure 13:
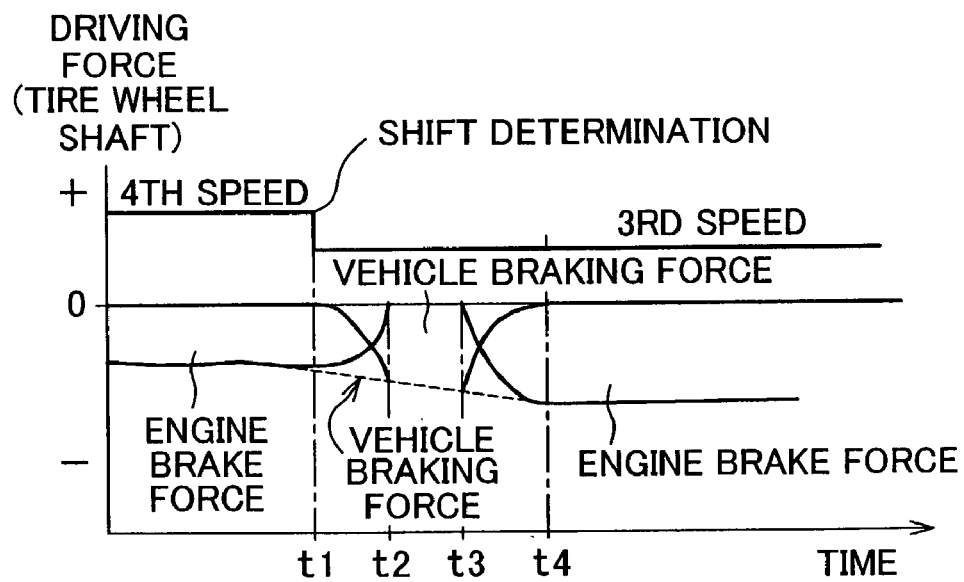
FIG. 13 is an exemplary time chart corresponding to the flowchart of FIG. 10.

FIG. 13 is a time chart indicating changes in the driving force of the vehicle A1 in a case where a downshift is performed with a completely closed state of accelerator operation during deceleration. Referring of FIG. 13, while the selected speed is the 4th speed, a negative driving force (i.e., a deceleration force or braking force) is provided by engine brake force, and no negative torque of the motor-generator (i.e., no regenerative braking torque thereof) is generated.

At a time point t1 when a determination to perform a downshift from the 4th speed to the 3rd speed is made, the torque transfer power of the clutch 7 is reduced to weaken the engine brake force, and the regenerative braking force of the motor-generator 11 is increased. That is, the driving force of the vehicle is provided by the braking force of the engine and the regenerative braking force of the motor-generator 11. At a time point t2 when the clutch 7 is completely released, engine brake force is no longer generated. Therefore, the braking force of the vehicle is provided by the regenerative braking force of the motor-generator 11.

Then, at a time point t3, the regenerative braking force of the motor-generator 11 starts to decrease, and the torque transfer power of the clutch 7 increases to strengthen the engine brake force. That is, the braking force of the vehicle is provided by the regenerative braking force of the motor-generator 11 and the engine braking force. Subsequently, at a time point t4 when the regenerative braking force of the motor-generator 11 is controlled to or below a predetermined value (zero), and the braking force of the vehicle is provided solely by engine brake force. The time points indicated in FIG. 13 have no correspondence to the time points indicated in FIGS. 11 and 12.

The control described above with reference to FIGS. 10 to 13 is also applicable to the vehicles illustrated in FIGS. 2, 3, 5 and 6. Steps S11 to S15 illustrated in FIG. 10 form a portion of the function determination in the invention. Although each of the vehicles A1 illustrated in FIGS. 3 and 6 has a construction in which the entire vehicle A1 is controlled by the electronic control unit 16 alone, it is also possible to adopt a control circuit in which an engine electronic control unit, a transmission electronic control unit, and a motor-generator electronic control unit are separately provided, and the electronic control units are interconnected for signal communications. That is, it is possible to provide either only one electronic control unit, or two or more electronic control units.

In the foregoing description, the "predetermined condition" based on which the torque transfer power of a clutch is controlled is the speed shift of the transmission. However, other "predetermined conditions" could be used in the framework of the present invention. Such "predetermined conditions" are conditions which have an influence on the power transfer in the driving force (or braking force) between the engine and the drive wheels.

The above description deals with embodiments in which the "physical quantity" which changes with a control of the torque transfer power is either the driving torque or the braking torque. However, other "physical quantities" should be applicable which relates to the speed of the vehicle and which changes with the control of the torque transfer power of the clutch.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A control apparatus of a vehicle, comprising:
    a clutch provided between a driving force source and a drive wheel;
    a clutch actuator that controls a torque transfer power of the clutch based on a predetermined condition;
    a behavior control apparatus that is provided separately from the clutch, that adjusts a physical quantity related to a speed of the vehicle that changes with a control of the torque transfer power of the clutch by the clutch actuator; and
    a function determiner that determines a driving force adjusting function or a braking force adjusting function in order to determine if a target torque can be output or if a target regenerative braking force can be generated by the behavior control apparatus, wherein
    the clutch actuator controls the torque transfer power of the clutch based on the predetermined condition and a result of a determination of the driving force adjusting function or the braking force adjusting function provided by the function determiner.

2. The control apparatus according to claim 1, wherein the predetermined condition includes a speed shift control of a transmission provided between the clutch and the drive wheel.

3. The control apparatus according to claim 2, further comprising a speed shift vehicle speed selector that selects a vehicle speed that serves as a reference for the speed shift control of the transmission based on a vehicle speed adjusting function of the behavior control apparatus determined by the function determiner.

4. The control apparatus according to claim 3, wherein the behavior control apparatus has a motor-generator,
    the function determiner determines a possible output of the motor-generator based on at least one of a temperature of the motor-generator and a possible output of an electricity storage, which supplies electric power to the motor-generator, and
    the speed shift vehicle speed selector sets a speed shift vehicle speed that serves as a reference for reducing a speed ratio of the transmission at a lower speed if the possible output of the motor-generator is below a predetermined value than if the possible output of the motor-generator is above the predetermined value.

5. The control apparatus according to claim 1, wherein the behavior control apparatus has a motor-generator.

6. The control apparatus according to claim 5, wherein the function determiner determines a possible output of the motor-generator based on at least one of a temperature of the motor-generator and a possible output of an electricity storage, which supplies electric power to the motor-generator.

7. The control apparatus according to claim 1, wherein the clutch actuator controls the torque transfer power of the clutch such that a mode switch is selectively performed among a first mode in which the clutch is engaged, a second mode in witch the clutch is released, and a third mode selecting in which the clutch slips.

8. The control apparatus according to claim 1, wherein the behavior control apparatus has a flywheel that adjusts the vehicle speed by storing a kinetic energy during a run of the vehicle and transferring a stored kinetic energy to a wheel.

9. The control apparatus according to claim 8, wherein the function determiner determines the driving force adjusting function or the braking force adjusting function based on a rotation speed of the flywheel.

10. The control apparatus according to claim 8, wherein the flywheel is provided within a vacuum container.

11. The control apparatus according to claim 8, further comprising an energy conversion apparatus that has a function of converting a kinetic energy transferred from the wheel to the flywheel into an electric energy and retaining the electric energy, and a function of converting a retained electric energy into a kinetic energy and transferring the kinetic energy to the wheel via the flywheel.

12. The control apparatus according to claim 11, wherein the energy conversion apparatus includes a motor-generator that converts a rotation energy of the flywheel into an electric energy.

13. A control method for a vehicle in which a torque transfer power of a clutch provided between a driving force source and a drive wheel is controlled by a clutch actuator based on a predetermined condition, and a physical quantity related to a speed of the vehicle that changes with a control of the torque transfer power of the clutch is adjusted by a behavior control apparatus that is provided separately from the clutch, the control method characterized by the steps of:
    determining a driving force adjusting function or a braking force adjusting function in order to determine if a target torque can be output or a target regenerative braking force can be generated by the behavior control apparatus; and controlling the torque transfer power of the clutch based on the predetermined condition and a result of a determination of the driving force adjusting function or the braking force adjusting function.

14. The control method according to claim 13, wherein the predetermined condition includes a speed shift control of a transmission.

15. The control method according to claim 14, further comprising a step of selecting a vehicle speed that serves as a reference for the speed shift control of the transmission based on a determined driving force adjusting function or braking force adjusting function of the behavior control apparatus.

16. The control method according to claim 13, wherein the behavior control apparatus adjusts the vehicle speed by storing a kinetic energy during a run of the vehicle and transferring a stored kinetic energy to a wheel.

17. The control method according to claim 16, further comprising a step of converting a kinetic energy transferred from the wheel into an electric energy and retaining the electric energy, and a step of converting a retained electric energy into a kinetic energy and transferring the kinetic energy to the wheel.

* * * * *